US008184156B2

(12) United States Patent
Mino et al.

(10) Patent No.: US 8,184,156 B2
(45) Date of Patent: May 22, 2012

(54) IMAGE DISPLAYING SYSTEM AND APPARATUS FOR DISPLAYING IMAGES BY CHANGING THE DISPLAYED IMAGES BASED ON DIRECTION OR DIRECTION CHANGES OF A DISPLAYING UNIT

(75) Inventors: Kazuhiro Mino, Kanagawa (JP); Akira Yoda, Kanagawa (JP); Shuichi Ohtsuka, Kanagawa (JP); Shuji Ono, Kanagawa (JP); Wataru Ito, Kanagawa (JP); Masahiko Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 79 days.

(21) Appl. No.: 12/570,932

(22) Filed: Sep. 30, 2009

(65) Prior Publication Data
US 2010/0040257 A1 Feb. 18, 2010

Related U.S. Application Data

(63) Continuation of application No. 10/857,600, filed on Jun. 1, 2004, now abandoned.

(30) Foreign Application Priority Data

Jun. 2, 2003 (JP) ................................. 2003-157268
Sep. 25, 2003 (JP) ................................. 2003-333054
May 28, 2004 (JP) ................................. 2004-160064

(51) Int. Cl.
*H04N 7/18* (2006.01)
*G06K 9/00* (2006.01)
(52) U.S. Cl. ......... 348/142; 348/135; 382/106; 382/107
(58) Field of Classification Search .................. 348/135, 348/142; 382/106, 107
See application file for complete search history.

(56) References Cited

U.S. PATENT DOCUMENTS

| 6,288,704 | B1 * | 9/2001 | Flack et al. .................. 345/158 |
| 6,389,179 | B1 | 5/2002 | Katayama et al. |
| 6,587,119 | B1 * | 7/2003 | Anderson et al. ............. 345/672 |
| 6,728,395 | B1 | 4/2004 | Kage et al. |

(Continued)

FOREIGN PATENT DOCUMENTS

EP    1 003 322 A2    5/2000

(Continued)

OTHER PUBLICATIONS

E.P. Office Action, dated Mar. 31, 2010. 4 pages.

(Continued)

*Primary Examiner* — Lin Ye
*Assistant Examiner* — Chia-Wei A Chen
(74) *Attorney, Agent, or Firm* — Sughrue Mion, PLLC

(57) ABSTRACT

An image displaying system for displaying an image operable to change a displayed image according to a direction of a image displaying apparatus, including: an image storing unit storing thereon the image; a displaying unit operable to display the image, the displaying unit being carried by a user; a photographing unit operable to photograph exterior as a plurality of photographed images, the photographing unit being carried with the displaying unit all together; a travel distance computing unit operable to compute a travel distance of the displaying unit by analyzing the plurality of photographed images which are photographed by the photographing unit at different times; and a display control unit operable to change the image, which is different from the photographed images, based on the travel distance computed by the travel distance computing unit and to causes the displaying unit to display the image.

45 Claims, 18 Drawing Sheets

U.S. PATENT DOCUMENTS

| | | |
|---|---|---|
| 6,788,828 B2 | 9/2004 | Katayama et al. |
| 7,187,412 B1 | 3/2007 | Silverstein |
| 7,366,360 B2 * | 4/2008 | Takiguchi et al. ............ 382/284 |
| 7,671,916 B2 * | 3/2010 | Hashimoto .............. 348/333.01 |
| 2001/0048465 A1 | 12/2001 | Toyofuku et al. |
| 2002/0075282 A1 * | 6/2002 | Vetterli et al. ................ 345/632 |
| 2002/0094026 A1 * | 7/2002 | Edelson ................... 375/240.01 |
| 2002/0109782 A1 | 8/2002 | Ejima et al. |
| 2002/0126890 A1 * | 9/2002 | Katayama et al. ............ 382/154 |
| 2002/0186412 A1 | 12/2002 | Murashita |
| 2004/0027330 A1 | 2/2004 | Bradski |
| 2004/0046736 A1 | 3/2004 | Pryor et al. |
| 2004/0046888 A1 * | 3/2004 | Jan et al. ....................... 348/335 |
| 2005/0212757 A1 * | 9/2005 | Marvit et al. ................. 345/156 |
| 2006/0146009 A1 * | 7/2006 | Syrbe et al. ................... 345/156 |

FOREIGN PATENT DOCUMENTS

| | | |
|---|---|---|
| JP | 09-322040 A | 12/1997 |
| JP | 10-240436 A | 9/1998 |
| JP | 10-254614 A | 9/1998 |
| JP | 2001-209488 A | 8/2001 |
| JP | 2002-007027 A | 1/2002 |
| JP | 2002-164990 A | 6/2002 |

OTHER PUBLICATIONS

JPO Office Action No. 370650 issued on Jun. 1, 2010 and partial translation of Examiners reasoning believed to be relevant to the cited references JP-A-2002-7027 and JP-A-10-254614.

* cited by examiner

210

| ANGLE | IMAGE |
|---|---|
| 0 | 0.JPG |
| 10 | 10.JPG |
| 20 | 20.JPG |
| ⋮ | ⋮ |
| 350 | 350.JPG |

*FIG. 3*

| ORIGINAL IMAGE | ANGLE OF VIEW |
|---|---|
| 001.JPG | 1° ~ 120° |
| 002.JPG | 121° ~ 240° |
| 003.JPG | 241° ~ 360° |

160

| θ | Px | φ |
|---|---|---|
| 30° | 3000 | 90° ~ 180° |
| 29° | 2950 | 87° ~ 90° |
| ⋮ | ⋮ | ⋮ |
| 2° | 1600 | 3° ~ 6° |
| 1° | 1550 | 1° ~ 3° |
| 0° | 1500 | 0° |
| -1° | 1450 | -1° ~ -3° |
| -2° | 1400 | -3° ~ -6° |
| ⋮ | ⋮ | ⋮ |
| -29° | 50 | -87° ~ -90° |
| -30° | 1 | -90° ~ -180° |

*FIG. 12*

IMAGE DISPLAYING SYSTEM AND APPARATUS FOR DISPLAYING IMAGES BY CHANGING THE DISPLAYED IMAGES BASED ON DIRECTION OR DIRECTION CHANGES OF A DISPLAYING UNIT

The present application is a Divisional Application of U.S. application Ser. No. 10/857,600, filed on Jun. 1, 2004, which claims priority from Japanese Patent Application Nos. 2003-157268 filed on Jun. 2, 2003, 2003-333054 filed on Sep. 25, 2003 and 2004-160064 filed on May 28, 2004 the contents of which are incorporated herein by reference.

BACKGROUND OF THE INVENTION

1. Field of the Invention

The present invention generally relates to an image displaying system, an image displaying apparatus and a machine readable medium storing thereon machine executable instruction. More particularly, the present invention relates to an image displaying system and an image displaying apparatus including a displaying unit carried by a user.

2. Related Art

An image displaying apparatus is an apparatus to display an image to provide a user with information, and it is one of the most commonly used information supply media in various applications. However, when many images are displayed continuously, it is quite difficult for the user to select useful information from the displayed images. For this reason, appropriate selection of the image to be displayed is required. Conventionally, there has been developed a navigation service system using GPS equipped portable telephone which allows users to quickly measure the location of a portable telephone through GPS positioning as shown on a web site at, for example, <http://www.kddi.com/english/corporate/news_release/2003/1006/index.html>.

When a user is carrying the image displaying apparatus and when the user changes the image being displayed according to the direction of the image displaying apparatus, the user can associate the content of the image with the direction. Therefore, it is preferable to change the image being displayed according to the direction of the displaying apparatus.

SUMMARY OF THE INVENTION

Therefore, it is an object of the present invention to provide an image displaying system, an image displaying apparatus and a machine readable medium storing thereon machine executable instructions which are capable of overcoming the above drawbacks accompanying the conventional art. The above and other objects can be achieved by combinations described in the independent claim. The dependent claims define further advantageous and exemplary combinations of the present invention.

According to a first aspect of the present invention, there is provided an image displaying system for displaying image. The image displaying system includes: an image storing unit storing thereon the image; a displaying unit operable to display the image, the displaying unit being carried by a user; a photographing unit operable to photograph exterior as a plurality of photographed images, the photographing unit being carried with the displaying unit all together; a travel distance computing unit operable to compute a travel distance of the displaying unit by analyzing the plurality of photographed images which are photographed by the photographing unit at different times; and a display control unit operable to change the image, which is different from the photographed images, based on the travel distance computed by the travel distance computing unit and to causes the displaying unit to display the image.

According to the image displaying system, the image storing unit may associate change information for changing the image with the travel distance of the displaying unit, and the display control unit may cause the displaying unit to display the changed image based on the change information on the image associated with the travel distance computed by the distance computing unit referring to the image storing unit.

According to the image displaying system, the image storing unit may associate a relative direction of each of a plurality of images with respect to a direction of one of the images with each of the plurality of images, and stores them, and the display control unit may select the image to be displayed on the displaying unit according to the relative direction.

According to the image displaying system, the photographing unit may be fixed to a rear surface of the displaying unit, the travel distance computing unit may compute a direction change of the displaying unit, the display control unit may select an image stored on the image storing unit so that difference between direction of the image being displayed and direction of the selected image corresponds to the direction change of the displaying unit, and updates the image being displayed on the displaying unit to the selected image.

According to the image displaying system, the image storing unit may store the original image, of which angle of view is wider than that of the image to be displayed, and a position in the original image as the change information, and the display control unit may identify the position in the original image based on change of direction of the displaying unit by referring to the image storing unit, trim the image from the original image so that the trimmed image is displayed on the displaying unit, and cause the displaying unit to display the image.

The image displaying system may further include an original image generation unit operable to generate the original image by composing the plurality of photographed images photographed by the photographing unit, and to cause the image storing unit to store the generated original image.

According to the image displaying system, the original image generation unit may compute a travel distance of the photographing unit during photographing the plurality of photographed images, and associates the computed travel distance with the position in the image.

According to the image displaying system, the original image generation unit may associate the associated travel distance and the position in the image with the original image, and stores them on the image storing unit.

According to the image displaying system, the original image generation unit may set one of the plurality of photographed images as a reference position image, and may compute a travel distance of the photographing unit based on the other photographed images with respect to the reference position image.

According to the image displaying system, the original image generation unit may compute a travel distance of the displaying unit during photographing the plurality of photographed images, associate the computed travel distance with the position in the original image, and cause the image storing unit to store them.

The image displaying system may further include a user photographing unit operable to photograph the user, the photographing unit being located on a side of the displaying unit, and the original image generation unit may compute the travel distance of the displaying unit during photographing the plurality of photographed images based on a user image photographed by the user photographing unit.

According to the image displaying system, the photographing unit may include a fish-eye lens, and the image displaying system may further include an original image generation unit operable to generate the original image by correcting distortion of the photographed images photographed by the fish-eye lens and to cause the image storing unit to store the original image.

The image displaying system may further include: a user photographing unit operable to photograph a user; and a ranging unit operable to compute change of distance between the user photographing unit and the user based on an image photographed by the user photographing unit, and the display control unit may scale up the image on the displaying unit as the distance between the user and the user photographing unit decreases.

The image displaying system may further include: an image photographing unit operable to photograph the image and causes the image storing unit to store the image, and the display control unit may raise photographing magnification of the image photographing unit as the distance between the user and the user photographing unit decreases.

According to the image displaying system, the image photographing unit may be located apart from the displaying unit and the display control unit, may receive instruction about the photographing magnification from the display control unit over radio, may change the photographing magnification of the image based on the received instruction, and may transmit the photographed image to the display control unit over radio.

According to the image displaying system, the display control unit may display a pointer pointing a part of the image on the displaying unit, and changes the part pointed by the pointer as change of the image based on the travel distance computed by the travel distance computing unit.

The image displaying system may further include an instruction input unit operable to receive an instruction from the user to change a position of the pointer, and the travel distance computing unit may compute the travel distance based on the photographed image of which the resolution is lower than the photographed image photographed in normal condition when the instruction input unit receives an instruction to change a position of the pointer.

According to the image displaying system, the photographing unit may include a plurality of image sensors provided corresponding to a plurality of pixels of the photographed image, and the instruction input unit may generate the photographed image based on pixel signals output from a part of the image sensors, and supplies the travel distance computing unit with them when the instruction input unit receives an instruction to change a position of the pointer.

According to the image displaying system, the photographing unit may include: an optical lens positioned between the plurality of image sensors and a subject; and an automatic focus unit operable to focus the optical lens on the subject, and the automatic focus unit may bring the optical lens out of focus from the subject and causes it to photograph the photographed image when the instruction input unit receives an instruction to change a position of the pointer.

According to the image displaying system, the photographing unit may photograph a dynamic image at a predetermined frame rate, and the travel distance computing unit may increase the frame rate of the photographing unit photographing the dynamic image when the instruction input unit receives an instruction to change a position of the pointer.

According to the image displaying system, the travel distance computing unit may perform image processing to increase contrast of the photographed image and may compute the travel distance based on the photographed image of which the contrast has been increased when the instruction input unit receives an instruction to change a position of the pointer.

According to the image displaying system, the photographing unit the focusing unit may further include a focusing unit operable to measure a distance to each of the subjects, and the travel distance computing unit computes the travel distance based on change of distance to the subject measured by the focusing unit and on change of position of the subject in the photographed subject, and the display control unit may compute the amount of change of position of the pointer based on the travel distance computed by the travel distance computing unit.

According to the image displaying system, the focusing unit may measure the distance to each subjects when the plurality of subjects are photographed in the photographed images, the distance computing unit may detect a subject, of which the distance measured by the focusing unit is the smallest, and the travel distance may be computed based on the detected change of distance to the subject and the change of position of the subjects.

According to the image displaying system, the travel distance computing unit may compute the travel distance further based on a ratio of the amount of change of the position of the subject, of which the distance is the smallest, to amount of change of position of each of the other subjects, of which the distances are different from the subject.

According to the image displaying system, the travel distance computing unit may compute at least one of velocity and acceleration of the displaying unit as the travel distance, and the display control unit may move a point on the display screen for a distance proportional to the travel distance computed by the travel distance computing unit.

According to a second aspect of the present invention, there is provided an image displaying apparatus operable to display an image, the image displaying apparatus being carried by a user. The image displaying apparatus includes: a displaying unit operable to display the image; a photographing unit operable to photograph exterior as a plurality of photographed images, the photographing unit being carried with the displaying unit all together; a travel distance computing unit operable to compute a travel distance of the displaying unit by analyzing the plurality of photographed images which are photographed by the photographing unit at different times; and a display control unit operable to change the image, which is different from the photographed images, based on the travel distance computed by the travel distance computing unit and to causes the displaying unit to display the image.

According to a third aspect of the present invention, there is provided a machine-readable medium having a plurality of machine executable instructions stored thereon for controlling an image displaying apparatus operable to display an image, the image displaying apparatus being carried by a user, when executed by a machine, the machine executable instructions causing the image displaying apparatus to: display the image on a displaying unit; photograph a plurality of photographed images of exterior using a photographing unit, the photographing unit being carried with the displaying unit all together; compute a travel distance of the displaying unit using a travel distance computing unit by analyzing the plurality of photographed images which are photographed by the photographing unit at different times; and change the image, which is different from the photographed images, based on the travel distance computed by the travel distance computing unit, and cause the displaying unit to display the image.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 is a table exemplary showing a data configuration of an image storing unit 210.

FIG. 12 is a table of an image storing unit indicating relationship among travel distances θ, horizontal pixel positions Px, and travel distances ψ.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
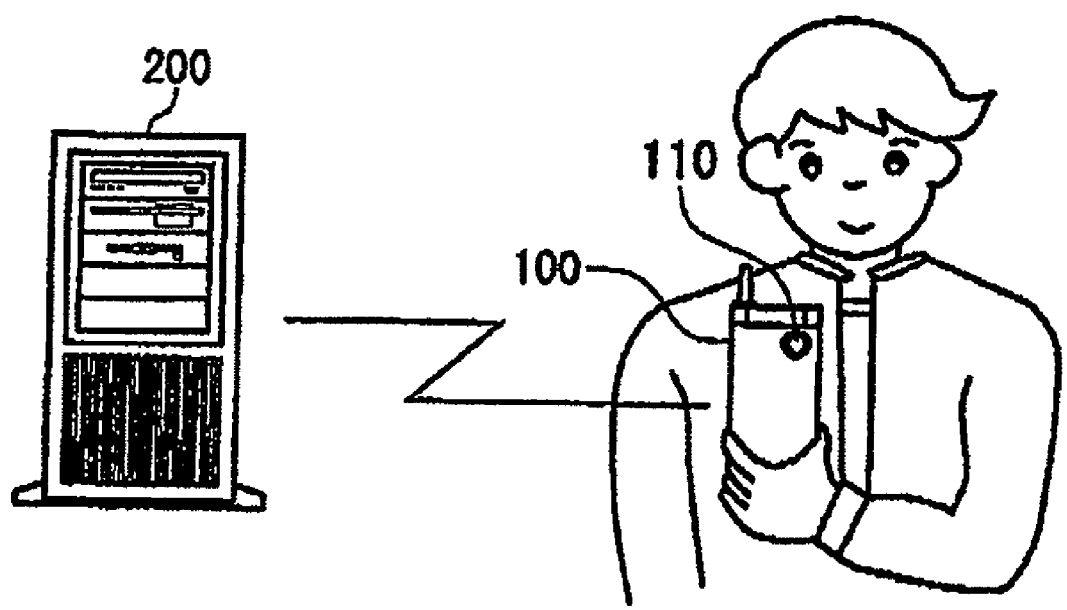
FIG. 1 is a schematic drawing exemplary showing an image displaying system according to an embodiment of the present invention.

FIG. 1 is a schematic drawing exemplary showing an image displaying system according to a first embodiment of the present invention. The image displaying system includes a portable telephone 100 and a display controller 200. The portable telephone 100 includes a photographing unit 110 on its rear surface and a displaying unit on its front surface. The portable telephone 100 causes the photographing unit 110 to photograph a dynamic image, analyzes the dynamic image, and computes direction change of the portable telephone 100, i.e., direction change of the displaying unit in a predetermined time interval (e.g., every five seconds). The portable telephone 100 transmits the direction change of the displaying unit computed by the portable telephone 100 over radio. The display controller 200 stores images in advance, which is to be displayed on the displaying unit 130, in association with directions. Then, the display controller 200 selects an image which is to be displayed on the displaying unit 130 based on the direction change of the displaying unit 130, and transmits the selected image to the portable telephone 100. The portable telephone 100 receives the transmitted image and updates the image to be displayed on the displaying unit 130 to the received image. Here, the portable telephone 100 is an example of the image displaying apparatus according to the present invention.

In this way, the image displaying system according to the present embodiment analyzes the image photographed by the photographing unit 110, of which the relative position with respect to the displaying unit 130 is fixed in advance, and computes the direction change of the displaying unit 130. Then, the image to be displayed is selected and updated based on the computed direction change. Therefore, the user of the portable telephone 100 can associate the content of the image with the direction to which the displaying unit is directed or with the direction change.

Figure 2:
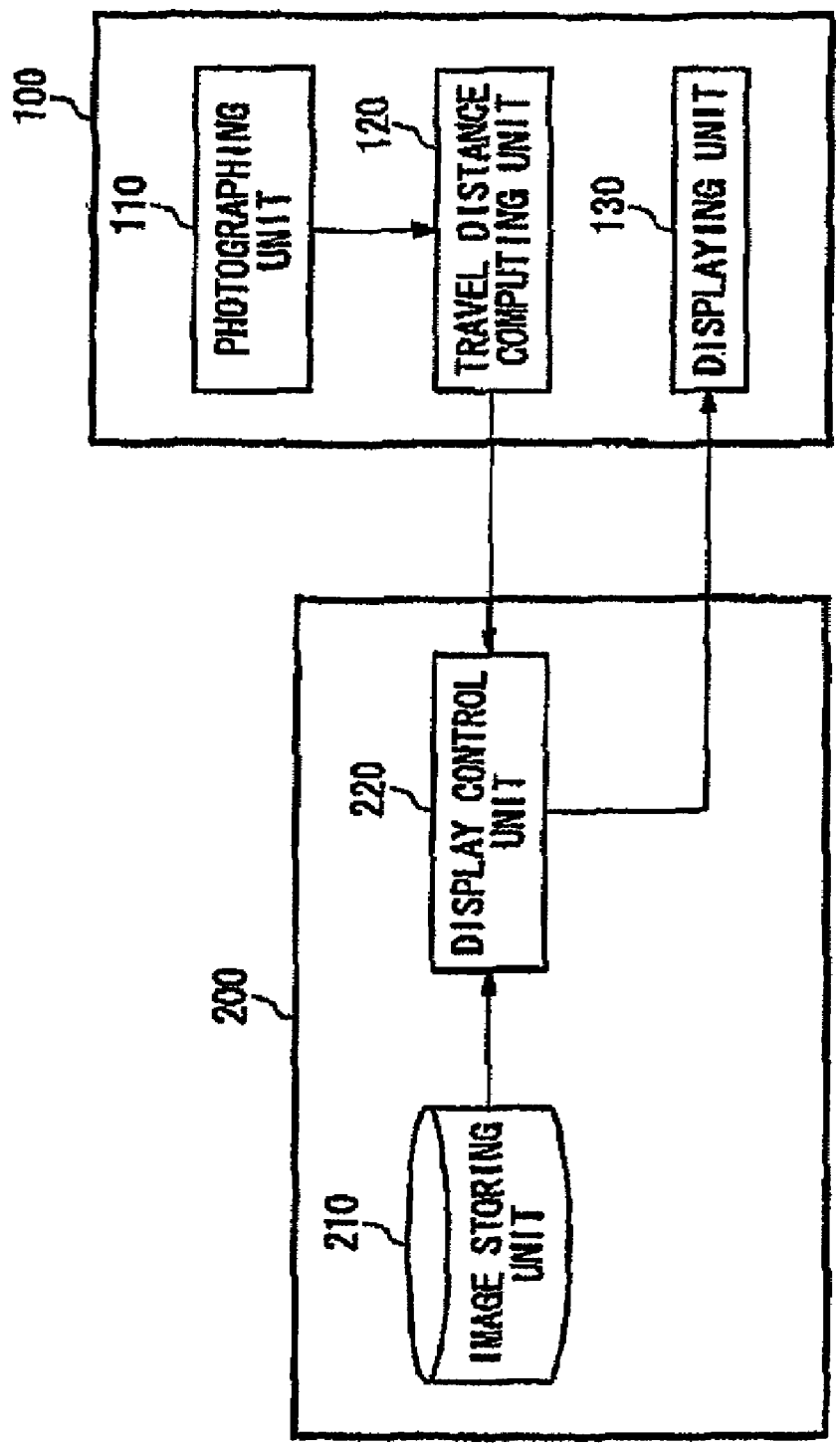
FIG. 2 is a block diagram illustrating a configuration of a portable telephone and a display controller.

FIG. 2 is a block diagram illustrating a configuration of the portable telephone 100 and the display controller 200. The portable telephone 100 includes a travel distance computing unit 120 and the displaying unit 130 as well as the photographing unit 110. For example, the photographing unit 110 is CCD. The CCD is positioned on the rear surface of the portable telephone 100 and photographs a dynamic image in the direction where the CCD is pointing, i.e., the direction perpendicular to the rear surface of the portable telephone 100. The travel distance computing unit 120 analyzes the dynamic image photographed by the photographing unit 110, and computes a direction change of the photographing unit 110 as a travel distance. Since the photographing unit 100 is fixed with respect to the displaying unit 130, the photographing unit 110 may consider that the computed direction change of the photographing unit 110 is the direction change of the displaying unit 130. Therefore, the travel distance computing unit 120 transmits the computed direction change of the photographing unit to the display controller 200 as the direction change of the displaying unit 130. The displaying unit 130 receives the image from the display controller 200 at any time and updates the image to be displayed on the displaying unit 130 to the latest image received from the display controller 200.

The display controller 200 includes an image storing unit 210 and a display control unit 220. The image storing unit 210 stores a plurality of images in association with photographing direction of the image. For example, the image storing unit 210 stores image data, such as JPEG image data, as the plurality of images. The display control unit 220 selects an image to be displayed on the displaying unit 130 based on the direction change of the displaying unit 130 and also based on the photographing direction of each of the plurality of images stored on the image storing unit 210. Then the display control unit 220 transmits the selected image to the displaying unit 130 of the portable telephone 100. For example, the display control unit 220 computes the direction to which the displaying unit 130 is directed, and selects the image corresponding to the computed direction from the image storing unit 210. In another embodiment, the display control unit 220 receives the direction change of the displaying unit 130, and selects an image so that the difference between the image being displayed on the displaying unit 130 and the selected image corresponds to the received direction change.

As described above, since the plurality of images are stored on the image storing unit 210 of the display controller 200, the portable telephone 100 need not store a plurality of images. Consequently, memory of the portable telephone 100 can be downsized, so that the smaller and lighter portable telephone 100 can be realized. According to another embodiment, the image storing unit 210 of the display control apparatus 200 stores a plurality of images in association with their names, and the portable telephone 100 may include: a storing unit storing thereon the image names in association with the directions; and the display control unit 220. In this case, the display control unit 220 identifies the name of the image referring to the storing unit, receives the image including the identified name from the image storing unit 210 of the display control apparatus 200, and displays it on the displaying unit 130. According to yet another embodiment, the portable telephone includes the image storing unit 210 and the display control unit 220 so that the external display control apparatus 200 may be omitted. In this case, since the portable telephone 100 does not need to communicate with any external device when changing the displaying images due to the movement of the portable telephone 100, the images can be changed fast and without being influenced by communication status. Moreover, since the portable telephone 100 computes the direction change of the displaying unit 130 by analyzing a dynamic image, it is not necessary to transmit the dynamic image taken by the photographing unit 110 to the display controller 200. Therefore, traffic between the portable telephone 100 and the display controller 200 can be reduced.

FIG. 3 is a table exemplary showing a data configuration of an image storing unit 210. In the present embodiment, the image storing unit 210 stores each of a plurality of images in association with angle when the image is displayed on the displaying unit 130. For example, the image storing unit 210 sets up a certain image as the reference position image, and each of the plurality of image is stored in association with the relationship between the image and the reference position image (e.g., the angle between the two images). In this way, even when the travel distance computing unit 120 cannot compute absolute direction, i.e., north, south, east and west, of the displaying unit 130, the display control unit 220 can update the image which is to be displayed on the displaying unit 130 based on the direction change of the displaying unit 130 by the operation as follows. That is, the reference position image is first displayed on the displaying unit 130. Then, when amount of the direction change of the displaying unit 130 is detected, the image to be displayed on the displaying unit 130 will be updated to a new image so that the difference between the image being displayed and the new image to be displayed corresponds to the detected direction change.

Figure 4:
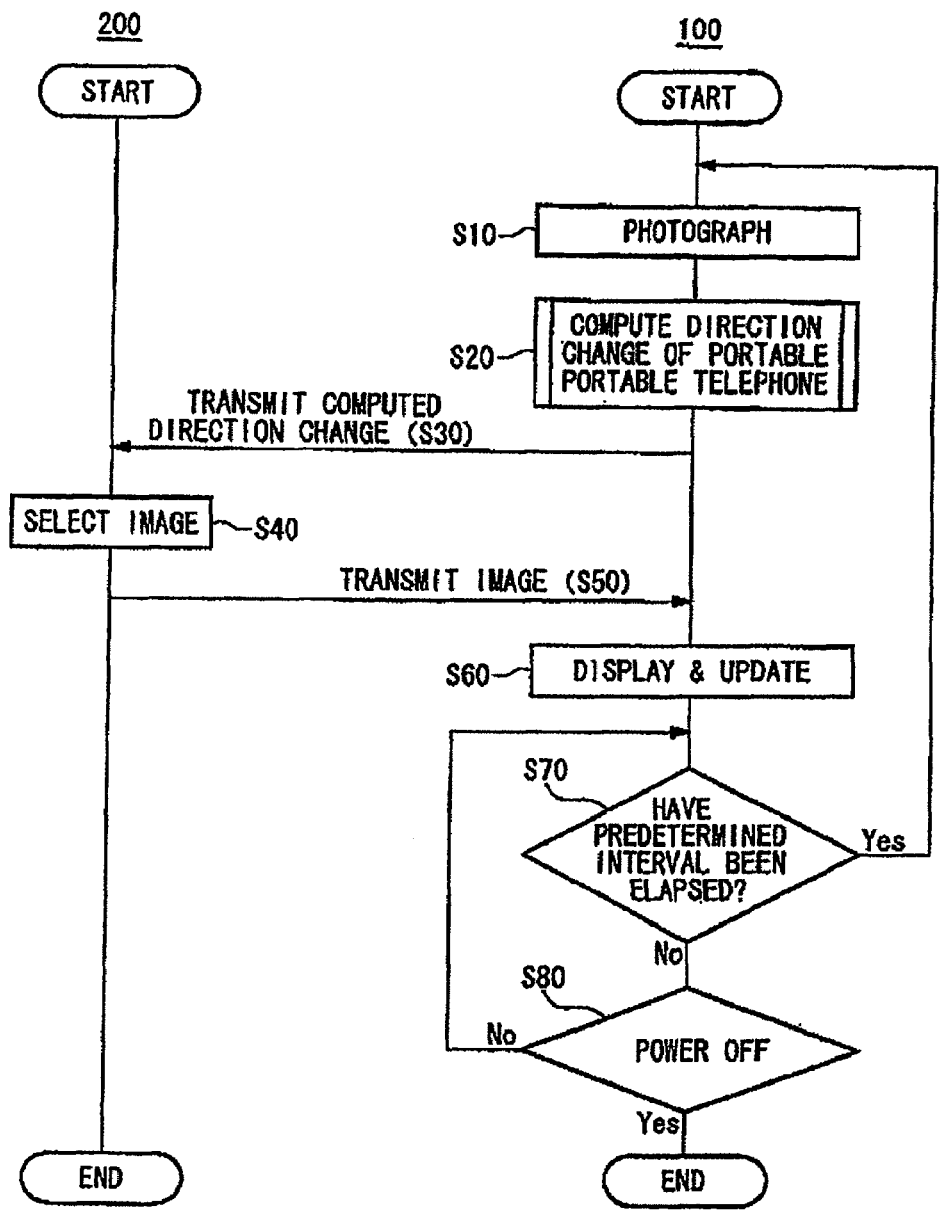
FIG. 4 is a flow chart exemplary showing an operation of the image displaying system according to the present embodiment.

FIG. 4 is a flow chart exemplary showing an operation of the image displaying system according to the present embodiment. The photographing unit 110 of the portable telephone 100 photographs a dynamic image (S10). The travel distance computing unit 120 analyzes the dynamic image photographed by the photographing unit 110, and computes direction change of the portable telephone 100, i.e., direction change of the displaying unit 130, (S20). Then, the travel distance computing unit 120 transmits the computed direction change of the displaying unit 130 to the display controller 200 (S30).

The display control unit 220 of the display controller 200 selects an image from the image storing unit 210 so that the difference between the image being displayed on the displaying unit 130 and the selected image corresponds to the direction change computed in the step S30 and received from the travel distance computing unit 120 (S40). Then, the display control unit 220 transmits the selected image to the displaying unit 130 in order to update the image of the displaying unit 130 (S50). Then, the displaying unit 130 displays the received image (S60).

The image displaying system repeats the steps described above form S10 to S60 every predetermined time interval, e.g., every five seconds (S70), until the operation of the portable telephone 100 ends (S80). Therefore, according to the image displaying system, even if the direction of the displaying unit 130 of the portable telephone 100 changes, the image corresponding to the direction after the direction change can be displayed on the displaying unit 130. Therefore, the user of the portable telephone 100 can associate the image being displayed on the displaying unit 130 with the direction of the displaying unit 130.

Figures 5, 6:
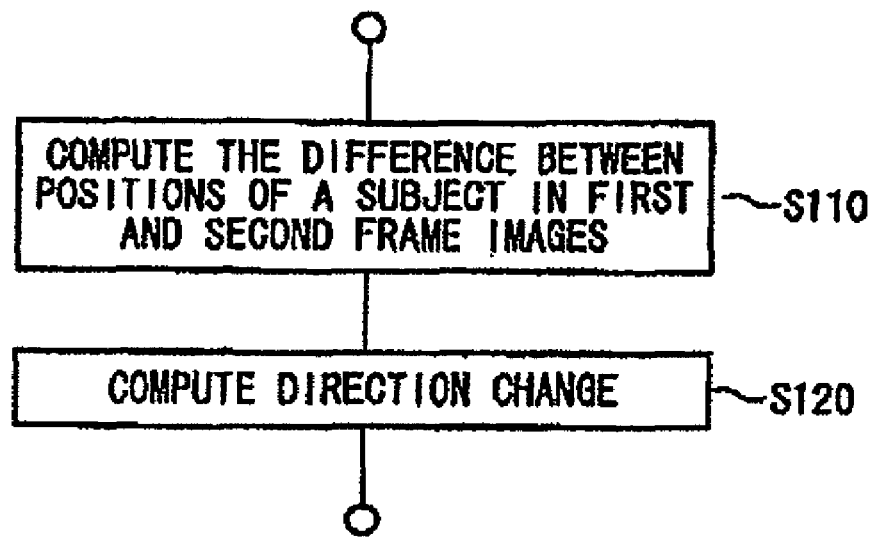
FIG. 5 is a flow chart illustrating a detail of step S20 shown in FIG. 4.
FIG. 6 is a table illustrating a data configuration of the image storing unit according to another embodiment of the present invention.

FIG. 5 is a flow chart illustrating a detail of the step S20 shown in FIG. 4. The travel distance computing unit 120 computes the difference between position of a subject in a first frame image and position of the subject in a second image photographed a predetermined interval before the first frame image is photographed (S110). Then, the direction change of the portable telephone 100 is computed using the difference between the positions of the subject in the images (S120). The difference between the positions of the subject is proportional to the direction change of the portable telephone 100, when the portable telephone 100 stands still. Therefore, the travel distance computing unit 120 can compute the direction change of the portable telephone 100 using the difference between the positions of the subject in the images.

FIG. 6 is a table illustrating a data configuration of the image storing unit 210 according to another embodiment of the present invention. In the present embodiment, the image storing unit 210 stores a plurality of original images, of which the angle of view is wider than that of the images to be displayed on the displaying unit 130, in association with the angle of views of the original images, respectively. In this case, the display control unit 220 trims the original image to generate the image to be displayed on the displaying unit 130 based on the direction change of the displaying unit 130, information on the angle of view of the original images, and information on the angle of view of the images to be displayed. In this way, the image displaying system can change the images on the displaying unit 130 continuously. It is preferable that the summation of the angles of view of the plurality of original images is equal to or wider than 360 degrees.

Figure 7:
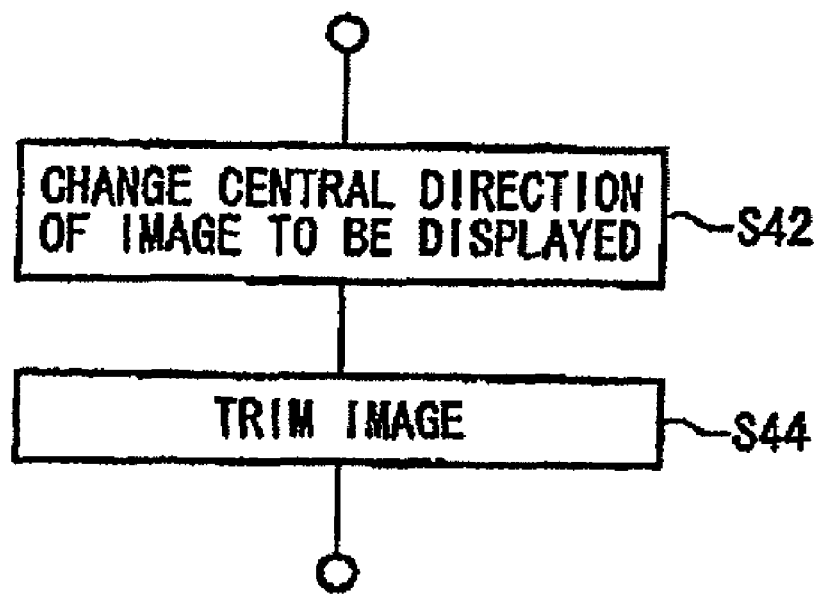
FIG. 7 is a flow chart illustrating a detail of step S40 shown in FIG. 4 in case that the image storing unit stores data having the configuration shown in FIG. 6.

FIG. 7 is a flow chart illustrating a detail of step S40 shown in FIG. 4 in case that the image storing unit 210 stores data having the configuration shown in FIG. 6. Information on the angle of view of the image to be displayed on the displaying unit 130 is included in the display control unit 220 in advance. Then, the display control unit 220 changes the central direction of the image to be displayed on the displaying unit 130 by amount of the direction change computed by the travel distance computing unit 120 so that the direction of the image to be displayed on the displaying unit 130 is defined (S42). Then, using the information on the newly defined center and the information on the angle of view of the displaying unit 130, a range which should be trimmed from the original image is determined, then the original image is trimmed according to the determination for generating the image to be displayed (S44). When the image to be displayed has to be generated from a plurality of original images, each of the plurality of original images are trimmed, the two trimmed images are connected, and then the image to be displayed is generated. In this way, the display control unit 220 can generate the image from the original image(s) with respect to the direction change of the displaying unit 130.

Figure 8:
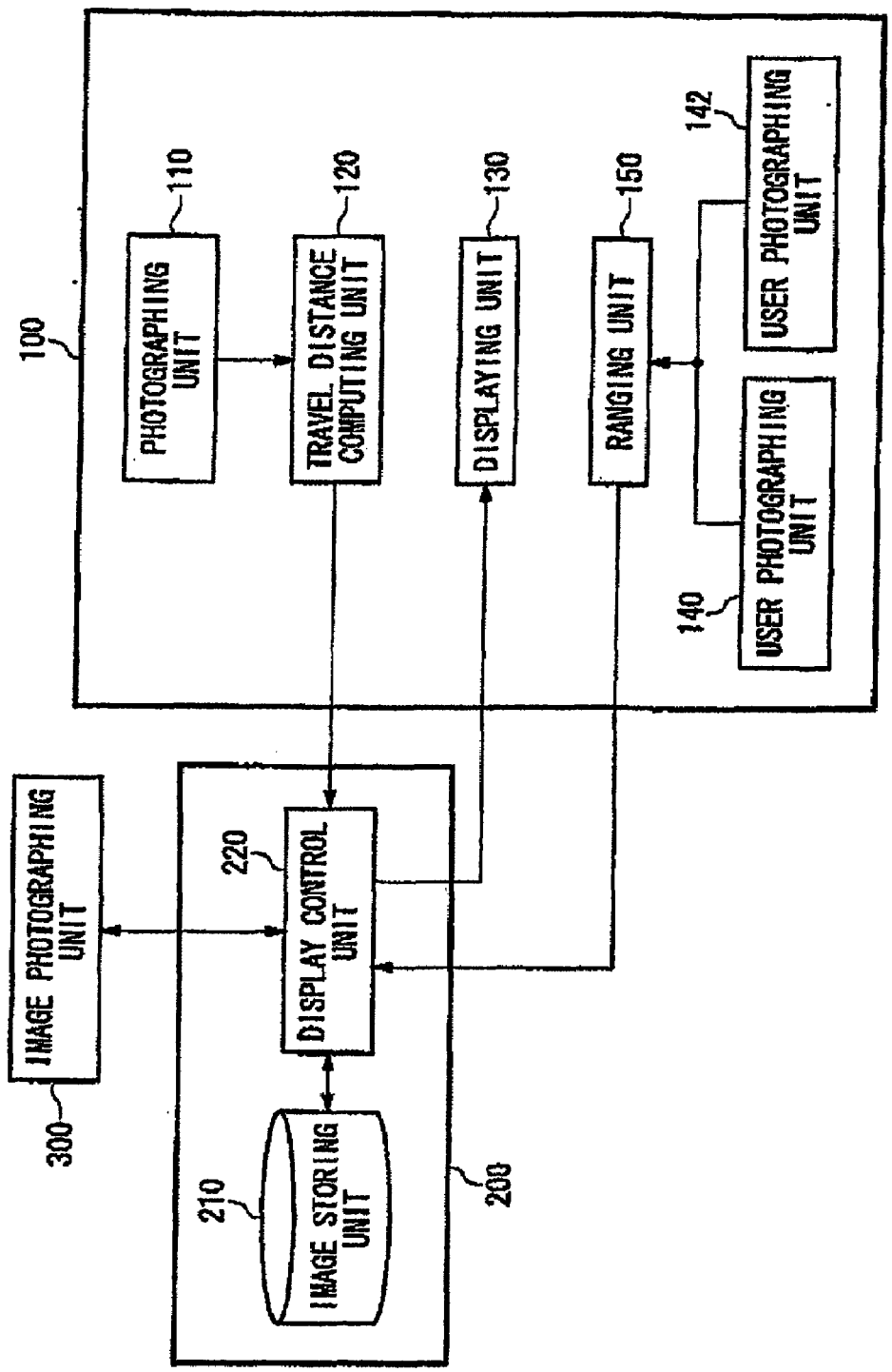
FIG. 8 is a block diagram illustrating an image displaying system according to another embodiment.

FIG. 8 is a block diagram illustrating an image displaying system according to another embodiment. In the present embodiment, the image displaying system further includes user photographing units 140 and 142, a ranging unit 150, and an image photographing unit 300 in addition to the configuration of the image displaying system illustrated in FIG. 2.

The user photographing units 140 and 142 are provided on a front surface of the portable telephone 100 being spaced apart from each other, thereby a dynamic image of the user of the portable telephone 100 will be photographed. The ranging unit 150 analyzes a frame image of the dynamic image photographed by the user photographing units 140 and 142 by triangulation, computes change of the distance between the portable telephone 100 and the user, and transmits the result to the display control unit 220 of the display controller 200.

The image photographing unit 300 is located apart from the portable telephone 100 and the display controller 200. The image photographing unit 300 receives the instruction from the display control unit 220 of the display controller 200 over radio, and photographs an image based on the instruction. Then, the photographed image is transmitted to the display control unit 220 over radio. For example, the instruction from the display control unit 220 is an instruction about the magnification of the photographing. The display control unit 220 stores the image storing unit 210 with the image received from the image photographing unit 300.

In the present embodiment, the display control unit 220 controls the image photographing unit 300 using the information on the change of the distance between the portable telephone 100 and the user, which is received from the ranging unit 150. For example, the display control unit 220 raises the magnification of the image photographing unit 300 as the distance between the portable telephone 100 and the user decreases. In this way, the magnification of the image to be displayed on the displaying unit increases as the face of the user approaches the displaying unit 130. Therefore, the user can easily check the image displayed on the displaying unit 130 with sufficient clarity by bringing the face of the user close to the displaying unit 130.

In addition, the display control unit 220 may change the magnification of the image of the displaying unit 130 by image processing. For example, the magnification of the digital zoom of the image may be raised as the distance between the portable telephone 100 and the user decreases. Alternatively, the display control unit 220 transmits the image photographed by the image photographing unit 300 to the displaying unit 130 without any processing and causes the displaying unit 130 to display the image. Moreover, the ranging unit 150 may decide the change of the distance between the user and the portable telephone 100 based on change of proportion of the image of the user with respect to the entire frame image in the dynamic image photographed by either the user photographing units 140 or 142. The ranging unit 150 decides that the distance between the portable telephone 100 and the user decreases when the proportion of the image increases, and that the distance between the portable telephone 100 and the user increases when the proportion of the image decreases.

Figure 9:
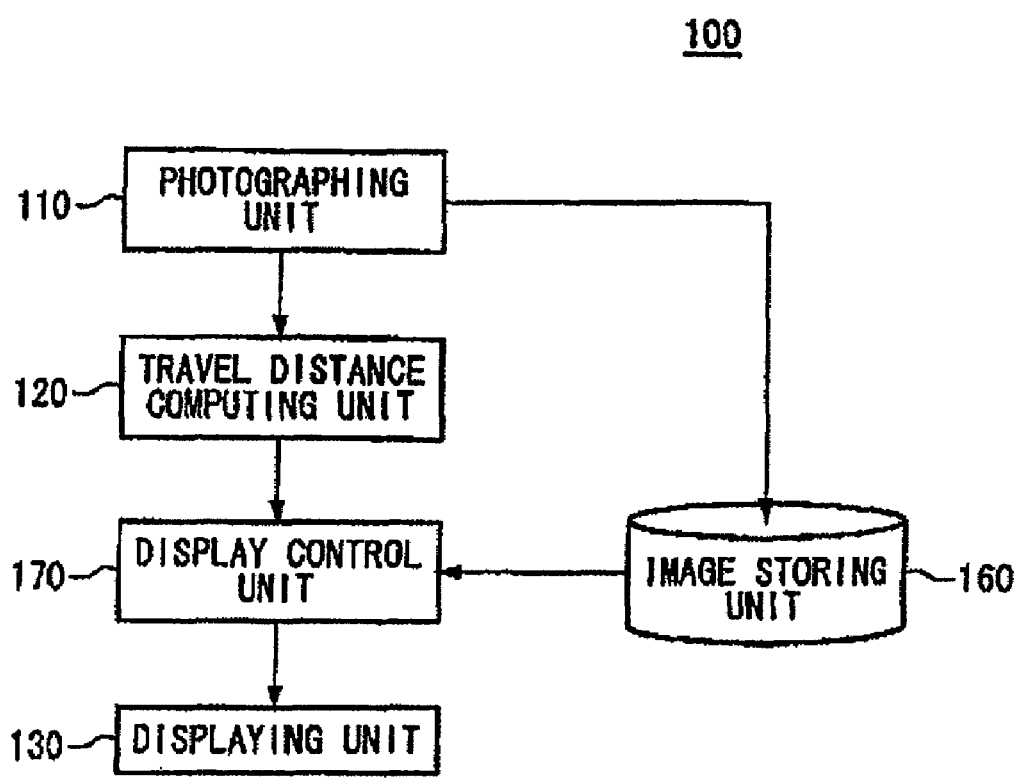
FIG. 9 is a block diagram illustrating an image displaying system according to another embodiment.

FIG. 9 is a block diagram indicating an image displaying system according to another embodiment. In the present embodiment, the portable telephone 100 further includes an image storing unit 160 and a display control unit 170 in addition to the photographing unit 110, the travel distance computing unit 120, and the displaying unit 130. A configuration of the image storing unit 160 is similar to that of the image storing unit 210 described above, and operation of the display control unit 170 is similar to that of the display control unit 220 described above. Moreover, the photographing unit 110 stores the image storing unit 160 with the image which is photographed based on an instruction from the user. In this way, when the user photographs his/her face from a plurality of directions using the photographing unit 110 and causes the image storing unit 160 to store them, the user can check the images of his/her face in association with the photographing directions concurrently. That is, the portable telephone 100 can be used as a substitute of a mirror.

In yet another embodiment of the image displaying system, the image storing unit 210 stores the plurality of images in association with the absolute directions, respectively. In this case, a plurality of template images respectively corresponding to the different absolute directions are stored in the travel distance computing unit 120 in advance, and the absolute direction of the portable telephone 100 will be computed by comparing these template images with the image photographed by the photographing unit 110.

Figure 10:
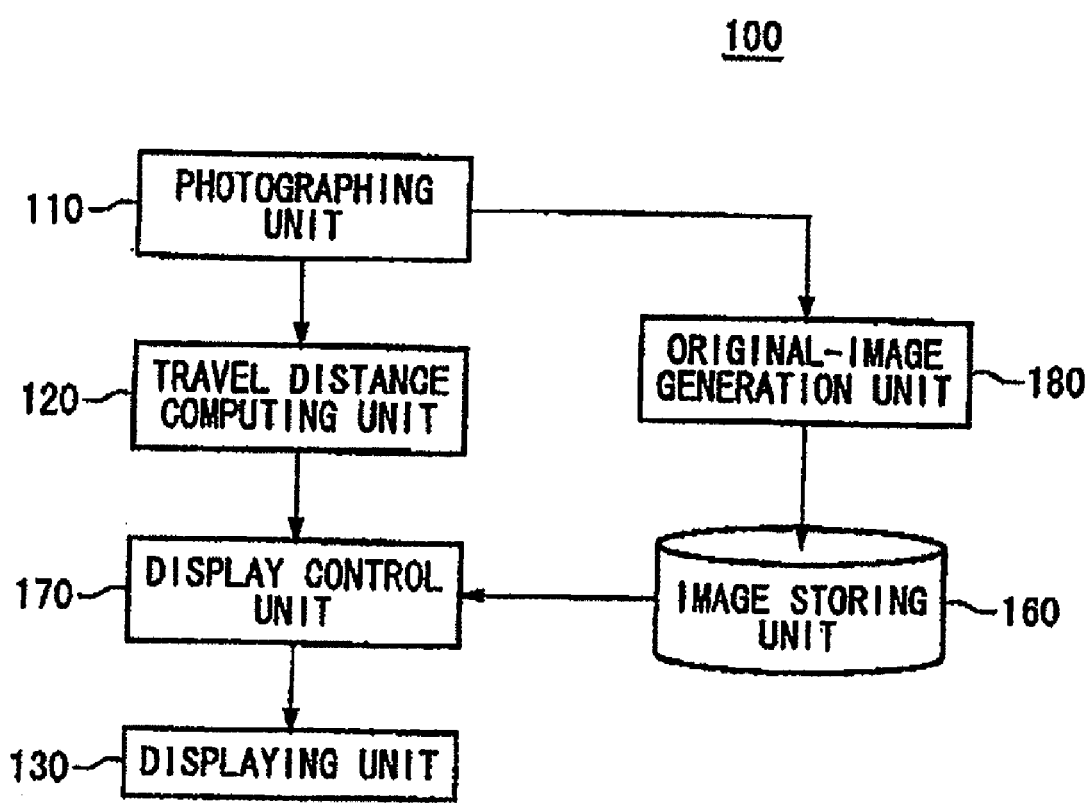
FIG. 10 is a block diagram illustrating an image displaying system according to yet another embodiment.

FIG. 10 is a block diagram illustrating an image displaying system according to yet another embodiment. According to the present embodiment, the portable telephone 100 includes an original image generation unit 180 as well as the photographing unit 110, the travel distance computing unit 120, the displaying unit 130, the image storing unit 160, and the display control unit 170. Since the configuration and the operation of the travel distance computing unit 120, the displaying unit 130, the image storing unit 160, and the display control unit 170 shown in FIG. 10 are similar to those which bear the same reference numerals that have been explained with reference to FIG. 9, the explanation will be omitted.

The portable telephone 100 shown in FIG. 10 generates a panoramic original image from a plurality of images, and stores and displays the original image. Therefore, the photographing unit 110 of the portable telephone 100 photographs the plurality of images, the original image generation unit 180 generates the original image from the plurality of photographed images, and the image storing unit 160 stores the generated original image. Furthermore, the original image generation unit 180 computes the travel distance of the photographing unit 110 during photographing the plurality of images, associates the computed travel distance with the position in the original image, and causes the image storing unit 160 to store them.

Figure 11:
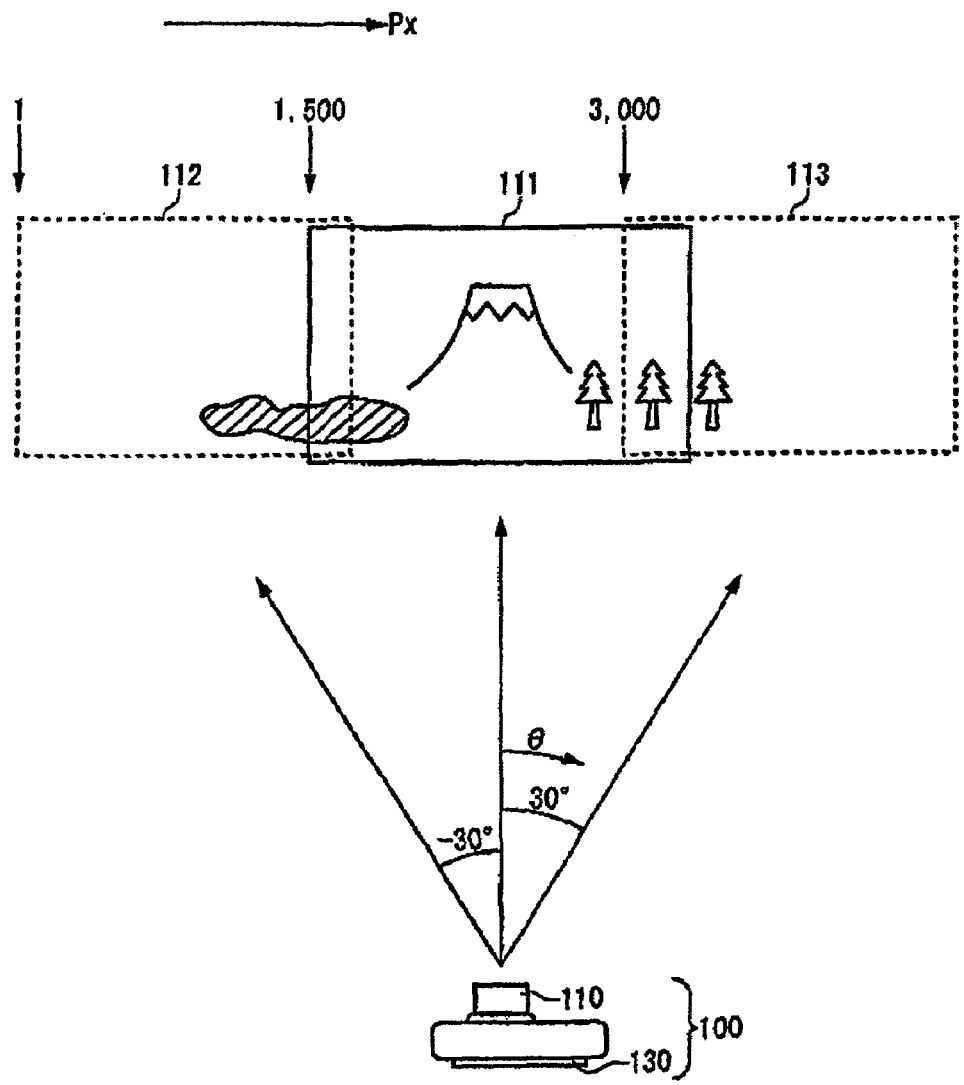
FIG. 11 is an explanatory drawing illustrating operation of generating a panoramic original image.

FIG. 11 is an explanatory drawing illustrating operation of generating a panoramic original image. First, the photographing unit 110 photographs a plurality of images to generate a panoramic original image. In the embodiment shown in FIG. 11, the photographing unit 110 photographs the three images 111, 112, and 113 which are aligned horizontally. The original image generation unit 180 generates the original image from the three images by overlapping the three images so as to match the edges of the images. The area of the original image is larger than that of each of the images photographable by the photographing unit 110 in one shot. Furthermore, the original image generation unit 180 stores the generated original image on the image storing unit 160. According to the present embodiment explained hereinafter, the area of an image photographed by the photographing unit 110 in one shot is the same as the area of the image displayable on the displaying unit 130. However, this is merely an example and the embodiment of the present invention is not limited in this respect.

Furthermore, the original image generation unit 180 computes the travel distance of the photographing unit 110 during photographing a plurality of images. In the example shown in FIG. 11, the original image generation unit 180 sets one of the plurality of photographed images 111, 112, and 113 as a reference position image prior to the computation of the travel distance. For example, the original image generation unit 180 sets the image 111 as the reference position image because the area overlapping with the other images is larger than each of the images 112 and 113. Next, the original image generation unit 180 computes the travel distance of the photographing unit 110 based on the relative position between the reference position image and the other images. In many cases, since the photographing unit 110 rotates around a user during panorama photographing, the original image generation unit 180 computes the angle of rotation of the photographing unit 110 as the travel distance of the photographing unit 110, for example. Here, when the horizontal angle of view photographable by the photographing unit 110 in one shot is known, based on the areas overlapping with the reference position image 111, the original image generation unit 180 can compute the angle of rotation of the photographing unit 110 when photographing the images 112 and 113, which are to be joined with the reference position image 111. In one example, the original image generation unit 180 computes that the angle of rotation of the photographing unit 110 when photographing the photographed image 112 is −30 degrees with respect to the reference position image 111, and that the angle of rotation of the photographing unit 110 when photographing the photographed image 113 is +30 degrees with respect to the reference position image 111. However the method how the original image generation unit 180 sets up the reference position image is not limited in this respect. Alternatively, the user designates an image as the reference position image when photographing the image by the photographing unit 110 so that the original image generation unit 180 may set up the designated image as the reference position image.

FIG. 12 is a table of the image storing unit 160, which associates the travel distances θ of the photographing unit 110 at the time of photographing for generating the original image, with the horizontal pixel positions Px in the original image and the travel distances ψ of the photographing unit 110 at the time of the playback of the image, and stores these θ, Px, and ψ. The original image generation unit 180 generates the table which associates the travel distances of the photographing unit 110 at the time of photographing with the positions in the original image, and stores them on the image storing unit 160. According to an example illustrated in FIGS. 11 and 12, the original image generation unit 180 identifies the positions Px in pixels of the left ends of the images 111, 112 and 113 as 1500, 1 and 300, respectively. Furthermore, the original image generation unit 180 associates each of the pixel positions Px of the left ends of the images 112 and 113 with the computed travel distances θ, respectively, assuming the computed travel distance θ corresponding to the pixel position Px of the left end of the image 111 (i.e., 1500) to be zero. Thus, the original image generation unit 180 associates more finely the pixel positions Px of the original image with the travel distances θ at the time of the photographing of the photographing unit 110. In the embodiment shown in FIG. 12, increment of the travel distances θ is proportional to increment of the associated pixel positions Px of the original image.

The original image generation unit 180 further associates the travel distances ψ of the photographing unit 110 at the time of playback of the original image with the horizontal pixel positions Px in the original image. In this case, the original image generation unit 180 may assume the travel distances θ of the photographing unit 110, which are already associated with the horizontal pixel positions Px in the original image, to be the travel distances ψ at the time of the playback. In this way, since the moving distance of the original image is the same as that of the photographing unit 110 at the time of the playback, the user can move an image with the same feeling as when photographing the image. Alternatively, the original image generation unit 180 may associate the distances ψ at the time of the playback, whose values are different from the travel distances θ at the time of the photographing of the original image, with the horizontal pixel positions Px in the original image. In the example shown in FIG. 12, the original image generation unit 180 associates the pixel positions Px of the original image with the travel distances ψ at the time of the playback from −90 degrees to +90 degrees. Since the increment of the travel distances ψ at the time of the playback is larger than the increment of the travel distances θ at the time of photographing, both of which are associated with the pixel positions Px of the original image, the user can move the image displayed on the displaying unit 130 more finely than at the time of photographing.

As described above, according to the embodiments shown in FIGS. 10-12, the panoramic original image photographed by the portable telephone 100 can be displayed continuously on the displaying unit 130 as an image by moving the portable telephone 100 so that the image displayed on the displaying unit also moves according to the movement of the portable telephone 100. Moreover, since the travel distances θ of the photographing unit 110 at the time of the photographing of the original images are associated with the horizontal pixel positions Px in the original image by the original image generation unit 180 in a portable telephone 100 during the original image is being generated, the association can be done rapidly and certainly without communicating with any other devices, and the association can be utilized for the playback of the original image. Moreover, since one of the plurality of photographed images is set as the reference position image, the travel distances of the photographing unit 110 can be computed relatively using the relative position between the reference position image and the other images, and the computation result can be used at the time of the playback.

In the embodiments described with reference to FIGS. 10-12, both the original image and the table which associates the original image with the travel distances θ, the pixel positions Px, and the travel distances ψ are stored in the image storing unit 160 of the portable telephone 100. However, the way how both the original image and the table are stored is not limited in this respect. According to another embodiment, the image storing unit 160 stores the table, while the original image being stored in the display control apparatus 200 in the external server which is described with reference to FIG. 1. In yet another embodiment, both the table associated by the original image generation unit 180 and the original image may be stored in the external server. By using the external server, the amount of memory installed in the portable telephone 100 can be reduced. Therefore, the portable telephone 100 can be downsized, so that a user can carry it more easily.

In the embodiments shown in FIGS. 10-12, the original image generation unit 180 computes the travel distances θ of the photographing unit 110 at the time of photographing of the original image, and associates them with the pixel positions Px of the original image. However, the way of the association is not limited in this respect. For example, a user may photograph a plurality of images of a subject, such as a still life on a table or a building in the field, connect the photographed images so as to match their edges, and generate a panoramic original image. In this case, the photographing unit 110 circulates around the subject during photographing the plurality of images, and since the movement of the subject between the plurality of images in this case is less than that in the embodiments shown in FIGS. 10-12, it may be difficult to compute the angle of rotation of the photographing unit 110. In this case, it is preferable that the original image generation unit 180 further computes the travel distance of the displaying unit 130. For example, as well as the portable telephone 100 shown in FIG. 8, a user photographing unit 140 may be provided, and the original image generation unit 180 may assume the travel distance of the user photographing unit 140 to be the travel distance of the displaying unit 130 by the user photographing unit 140 photographing the user. Thereby, when the photographing unit 110 circulates around the subject, the position of the user on the image photographed by the user photographing unit 140 moves substantially. Therefore, the original image generation unit 180 can compute the travel distance of the user photographing unit 140 easily. In this case, the original image generation unit 180 associates the computed travel distance of the user photographing unit 140 and the pixel position of the original image. Therefore, even if the photographing unit 110 circulates around the subject to generate the original image, the travel distance of the displaying unit 130 and the pixel position of the original image can be associated with each other, so that they can be used at the time of the playback.

In addition, when the photographing unit 110 uses a fisheye lens for the photographing, the photographed image can be displayed on the displaying unit 130 in the same manner as the embodiments shown in FIGS. 10-12. In this case, the original image generation unit 180 stores in advance the data for correcting the distortion of an image photographed by the fish-eye lens, corrects the distortion of the photographed image using the data, and generates the original image. Here, since the angle of view of the fish-eye lens is wide, the area of the original image generated by the original image generation unit 180 is wider than the area of the image photographable by the photographing unit 110 in one shot. Furthermore, the original image generation unit 180 associates the pixel positions Px of the original image with the travel distances of the photographing unit 110 at the time of the playback. In this case for example, the original image generation unit 180 makes the area which can be photographed in one shot by the photographing unit 110 in the center of the original image to be the reference position image, and associates the pixel positions Px of the original image with the travel distances of the photographing unit 110 at the time of the playback based on the ratio of the angle of view of an image photographed with the fish-eye lens to the angle of view of an image photographed without the fish-eye lens. In this way, when the original image is generated from the image photographed by the photographing unit 110 using the fish-eye lens, the area displayed on the displaying unit 130 can be selectively trimmed from the original image by moving the portable telephone 100 and displayed on the displaying unit 130.

Figure 13A:
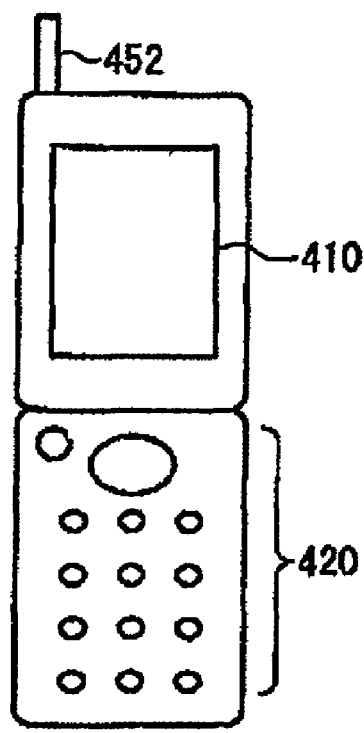
FIG. 13A is a surface view of the portable telephone according to yet another embodiment.
Figure 13B:
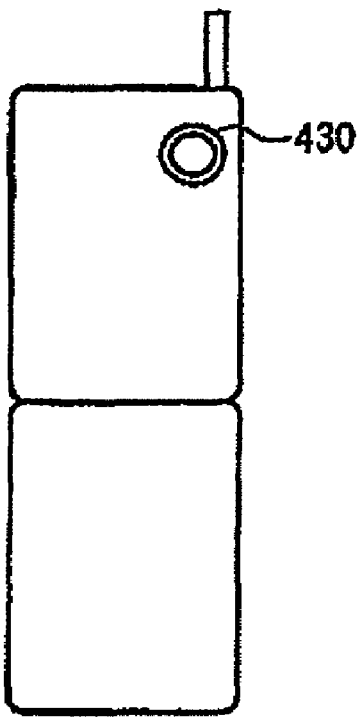
FIG. 13B is a rear view of the portable telephone according to yet another embodiment.

FIGS. 13A and 13B illustrate yet another embodiment of the portable telephone 100. FIG. 13A is a surface view of the portable telephone 100, and FIG. 13B is a rear view of the portable telephone 100. The portable telephone 100 includes a displaying unit 410 and an instruction input unit 420 on its front surface, and includes a photographing unit 430 on its rear surface. Moreover, the portable telephone 100 includes an antenna 452 on its side.

The displaying units 410 is a displaying apparatus, such as for example, a liquid crystal panel, and displays a plurality of menus which are to be selected by a user. For example, the portable telephone 100, which is a multifunctional portable telephone, permits user to communicate with others, to photograph an image, etc., and the user can select at least one of the functionalities using the menus displayed on the displaying unit 410. Moreover, when the portable telephone 100 photographs an image, the displaying unit 410 displays the image photographed by the photographing unit 430.

The instruction input unit 420 includes a plurality of keys pressed by a user to operate the portable telephone 100. Moreover, the photographing unit 430 includes CCD as image sensors, and generates an image based on the light detected by the CCD.

Moreover, the antenna 452 receives radio wave from a base station, and sends electric wave from the portable telephone 100 to the base station.

Figure 14:
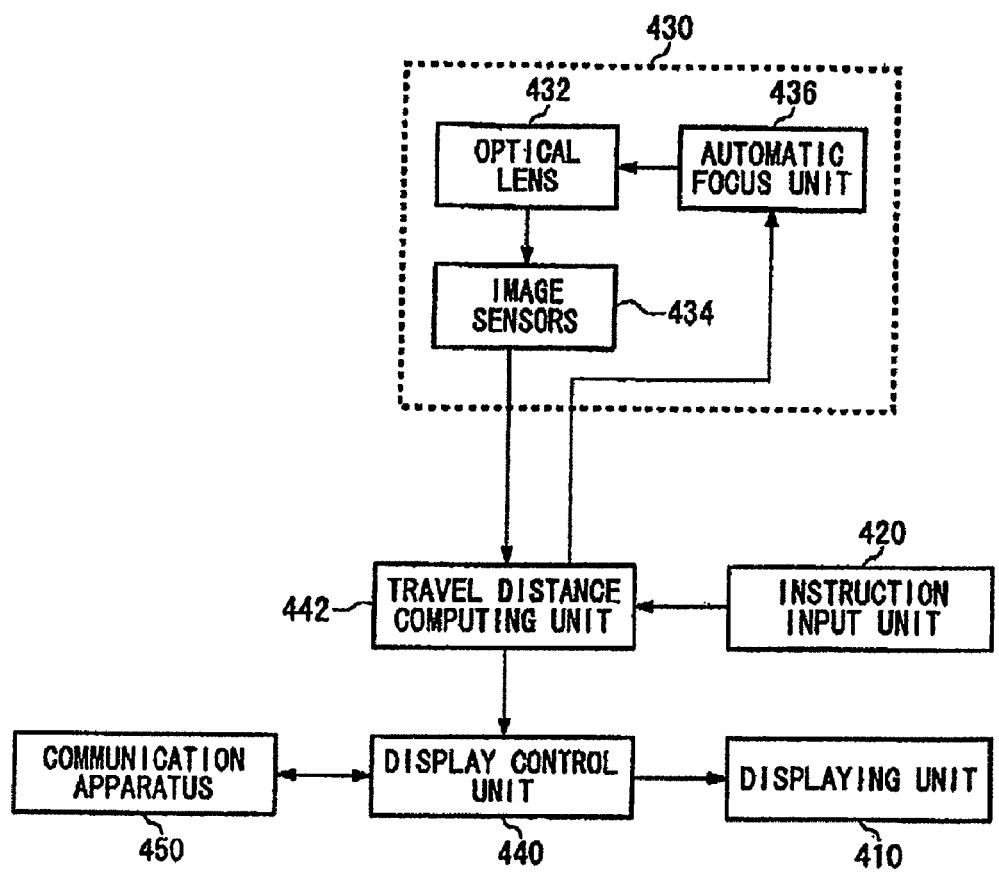
FIG. 14 is a block diagram exemplary showing a configuration of the portable telephone.

FIG. 14 is a block diagram exemplary showing a configuration of the portable telephone 100. The portable telephone 100 includes a displaying unit 410, an instruction input unit 420, a photographing unit 430, a display control unit 440, a travel distance computing unit 442, and a communication apparatus 450. The photographing unit 430 photographs an external image.

The photographing unit 430 includes an optical lens 432, a plurality of image sensors 434, and an automatic focus unit 436. For example, the plurality of image sensors 434 are a plurality of CCD, and are provided corresponding to a plurality of pixels of the image to be photographed by the photographing unit 430, and output pixel signals for the corresponding pixels, respectively.

The optical lens 432 is provided between the plurality of image sensors 434 and a subject, and adjusts the focus of the image to be photographed by the image sensors 434. The automatic focus unit 436 automatically focuses the optical lens 432 on the subject. For example, the automatic focus unit 436 controls the position of the optical lens 432 to change focal positions continuously, photographing a plurality of images at each focal positions, and selecting an image in the clearest focus among the plurality of photographed images. Moreover, the automatic focus unit 436 may include the focusing unit which measures distance to the subject, and control the focal position of the optical lens 432 according to the distance measured by the focusing unit.

The configuration and function of the displaying unit 410 and the instruction input unit 420 shown in FIG. 14 are similar to those of the displaying unit 410 and the instruction input unit 420 shown in FIG. 13. The displaying unit 410 displays a pointer pointing display information for a user or a part of the display information. Moreover, the user causes the instruction input unit 420 to change the position of the pointer. The communication apparatus 450 transmits/receives signals to/from the base station. Optionally, the communication apparatus 450 includes an antenna 452 for transmitting and receiving the signals.

The display control unit 440 controls the photographing unit 430, the displaying unit 410, the subject 422, and the communication apparatus 450 according to the instruction of the user from the instruction input unit 420. Moreover, when the instruction input unit 420 receives an instruction from the user to change the position of the pointer, the travel distance computing unit 442 computes the travel distance based on the motion of the photographing unit 430 according to the plurality of images photographed by the photographing unit 430 at different times. Here, since the photographing unit 430 and the displaying unit 410 are fixed to the portable telephone 100, the travel distance computing unit 442 provides the computed travel distance of the photographing unit 430 to the display control unit 440 as the travel distance of the displaying unit 410. Based on the travel distance, the display control unit 440 controls the position of the pointer displayed on the displaying unit 410.

Figure 15A:
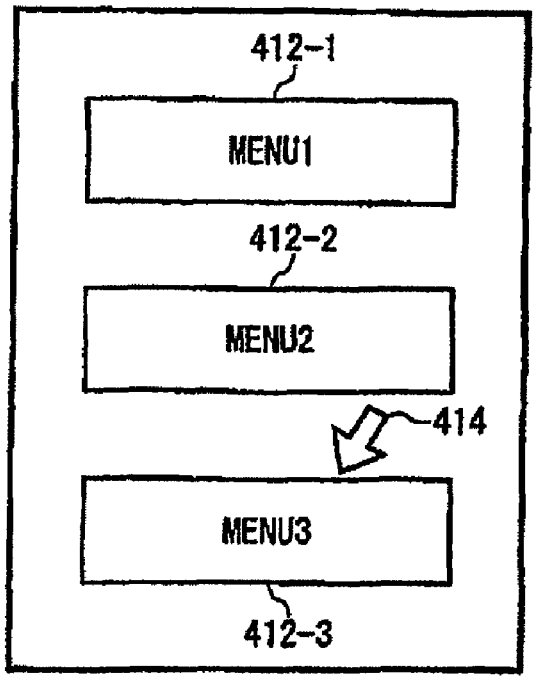
FIG. 15A is an explanatory drawing in which a displaying unit displays a plurality of menus.
Figure 15B:
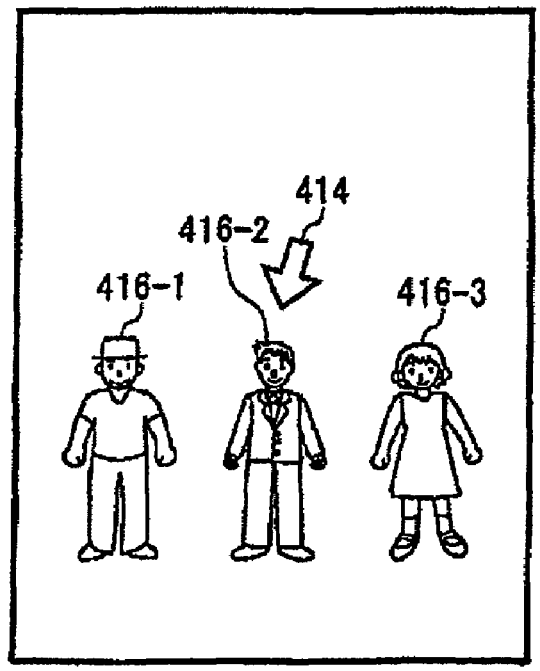
FIG. 15B is an explanatory drawing in which the displaying unit displays a photographed image.

FIGS. 15A and 15B illustrate examples of indications on the displaying unit 410. FIG. 15A is an explanatory drawing in which the displaying unit 410 displays a plurality of menus. As shown in FIG. 15A, the displaying unit 410 displays a plurality of menus 412-1 to 412-3 (to be referred to as 412 hereinafter) and a pointer 414. For example, the plurality of menus 412 indicate the plurality of functionalities of the portable telephone 100, and a user can select at least one of the functionalities by selecting at least one of the plurality of menus 412 on the displaying unit 410 by operating the pointer 414.

In the present embodiment, the user operates the pointer 414 by moving the portable telephone 100. For example, when the instruction input unit 420 receives instructions from the user to change the position of the pointer 414, the travel distance computing unit 442 computes the travel distance of the photographing unit 430 from change of the positions of the photographing unit 430, and the display control unit 440 controls the display position of the pointer 414 according to the travel distance.

The instruction input unit 420 includes a key pressed by a user when changing the positions of the pointer 414, and the travel distance computing unit 442 detects the change of the positions of the portable telephone 100 based on the images photographed by the photographing unit 430 continuously during the key is being pressed. In this way, the user can operate the pointer 414 easily and the operability of the portable telephone 100 is improved.

FIG. 15B is an explanatory drawing in which the displaying unit 410 displays the photographed image. The portable telephone 100 includes a memory storing thereon the image photographed by the photographing unit 430, and the displaying unit 410 displays a part of the photographed image. In this case, the displaying unit 410 displays the pointer 414 on the photographed image. For example, the user can enlarge and display the selected part of the image by operating the pointer 414 and selecting a part of the photographed image. For example, a plurality of subjects 416-1 to 416-3 (to be referred to as 416 hereinafter) are photographed and displayed on the displaying unit 410, and when the user selects one of the subjects 416 by operating the pointer 414, the displaying unit 410 enlarges the selected subject and displays it.

Thus, according to the portable telephone 100 in the present embodiment, the user can easily move the pointer 414 displayed on the displaying unit 410 to a desired position, so that the operability of the portable telephone 100 is improved.

Figure 16A:
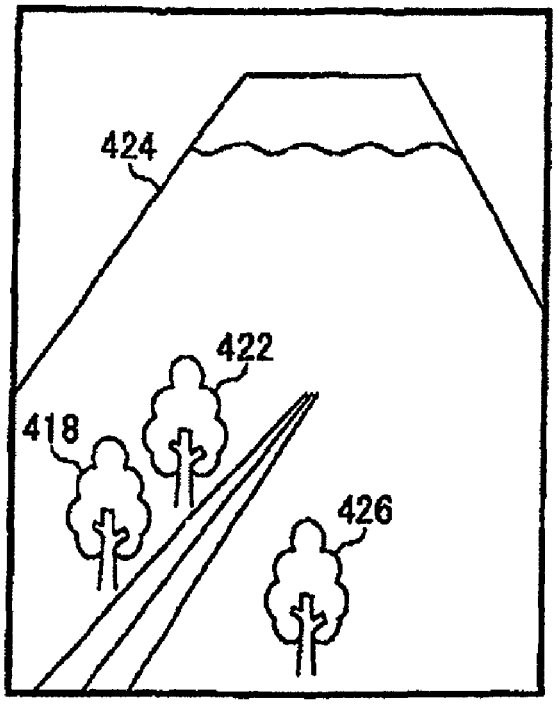
FIG. 16A is an explanatory drawing illustrating a photographed image of a certain frame.
Figure 16B:
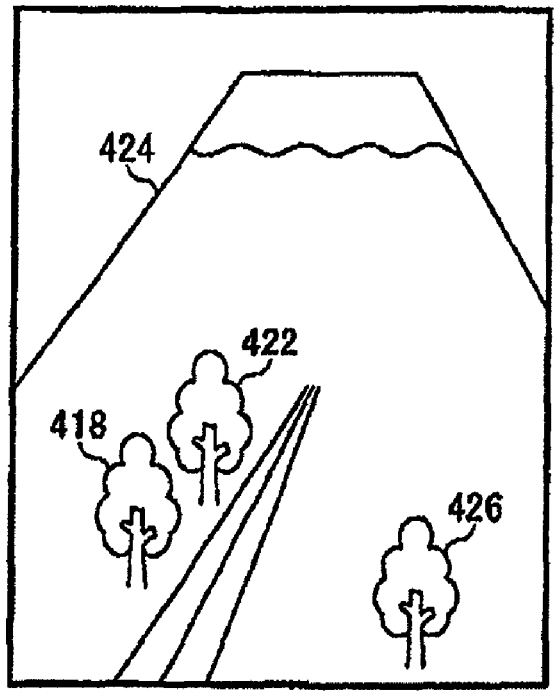
FIG. 16B is an explanatory drawing illustrating a photographed image of another frame.

FIGS. 16A and 16B illustrate a plurality of photographed images for detecting movement of the portable telephone. The photographing unit 430 photographs an external dynamic image at a predetermined frame rate, and when the instruction input unit 420 receives the instruction to change the position of the pointer 414, the travel distance computing unit 442 retrieves the dynamic image photographed by the photographing unit 430, and analyses the movement of the portable telephone 100 based on change between consecutive frames of the photographed dynamic image. In the present embodiment, FIG. 16A shows a photographed image at a predetermined frame, and FIG. 16B is a photographed image at the next frame.

The travel distance computing unit 442 compares the plurality of photographed images shown in FIGS. 16A and 16B with each other, and computes the travel distance of the portable telephone 100 as the travel distance of the displaying unit 410 based on the comparison result. For example, when the user translationally moves the portable telephone 100 to the left, a plurality of subjects 418, 422, 424 and 426 in the plurality of images photographed by the photographing unit 430 moves to the right in the photographed image. The travel distance computing unit 442 computes the travel distance of the portable telephone 100 based on the change of the positions of the subjects in the photographed images. The display control unit 440 controls the position of the pointer 414 according to the travel distance computed by the travel distance computing unit 442.

Moreover, the photographing unit 430 may further include a focusing unit to measure the distance to each of the subjects 418, 422, 424 and 426 in the photographed images. For example, the automatic focus unit 436 may act as the focusing unit. In this case, the automatic focus unit 436 may compute the distance to each of the subjects 418, 422, 424 and 426 based on the focal position adjusted according to the position of each of the subjects 418, 422, 424 and 426. The display control unit 440 may compute the travel distance of the portable telephone 100 based on the distance to the subjects 418, 422, 424 and 426 measured by the focusing unit and the position change of the subjects 418, 422, 424 and 426 in the photographed image, and may compute the amount of change of the position of the pointer 414 based on the computed travel distance.

Moreover, when images of the plurality of subjects 418, 422, 424 and 426 are photographed, the change of positions of the subjects 418, 422, 424 and 426 in the photographed images differs according to the distance from the photographing unit 430 to each of the subjects 418, 422, 424 and 426. For example, when the portable telephone 100 moves translationally without changing the photographing direction of the photographing unit 430, the change of position of each of the subjects 418, 422, 424 and 426 in the photographed images is in inverse proportion to the distance to each of the subjects 418, 422, 424 and 426.

In the present embodiment, since the distance between the photographing unit 430 and the subject 424 is very long, the change of position of the subject 424 in the photographed images are very few even if the portable telephone 100 moves translationally during photographing the images. For this reason, when the plurality of subjects 418, 422, 424 and 426 are photographed, it is preferable that the focusing unit measures the distance to each of the subjects 418, 422, 424 and 426, the travel distance computing unit 442 detects the subject 426 that is the closest to the photographing unit 430, and the travel distance of the portable telephone 100 is computed based on the measured distance to the subject 426 and the change of position of the subject 426 in the photographed images.

Moreover, the display control unit 440 may detect at least one subject, of which the distance measured by the focusing unit is smaller than a predetermined threshold, and may detect the movement and the travel distance of the portable telephone 100 based on the change of position of the subject(s).

Moreover, there are two modes for the movement of the portable telephone 100, namely, a translational mode in which the photographing direction of the photographing unit 430 does not change, and a rotational mode in which the photographing direction of the photographing unit 430 does change. Since the aspects of the change of position of the subjects 418, 422, 424 and 426 in the photographed images differ between these two modes, it is preferable that the travel distance computing unit 442 detects the mode of movement of the portable telephone 100 between the two modes.

Figure 17A:
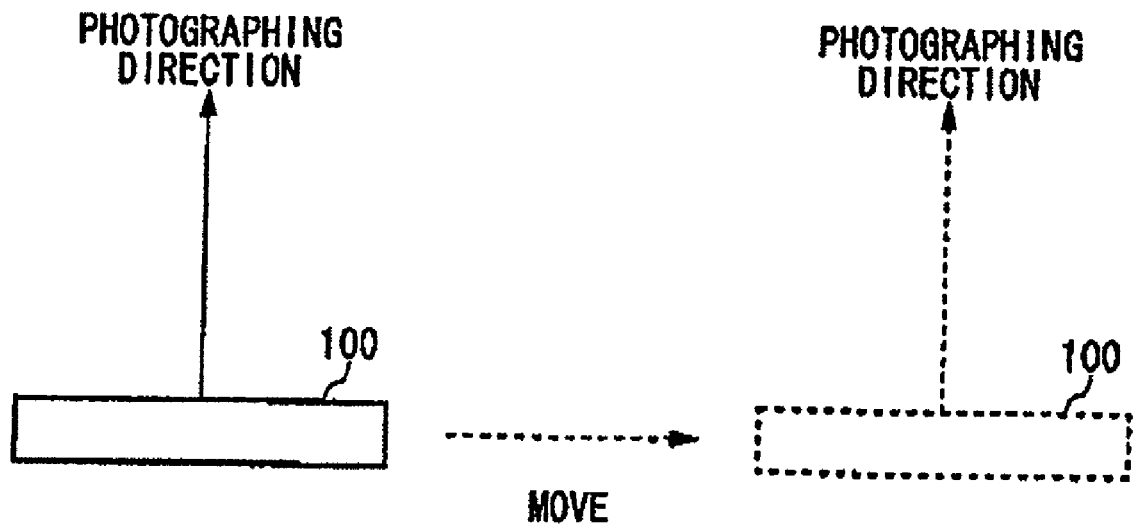
FIG. 17A is an explanatory drawing illustrating the portable telephone moving translationally in which a photographing direction of the photographing unit does not change.
Figure 17B:
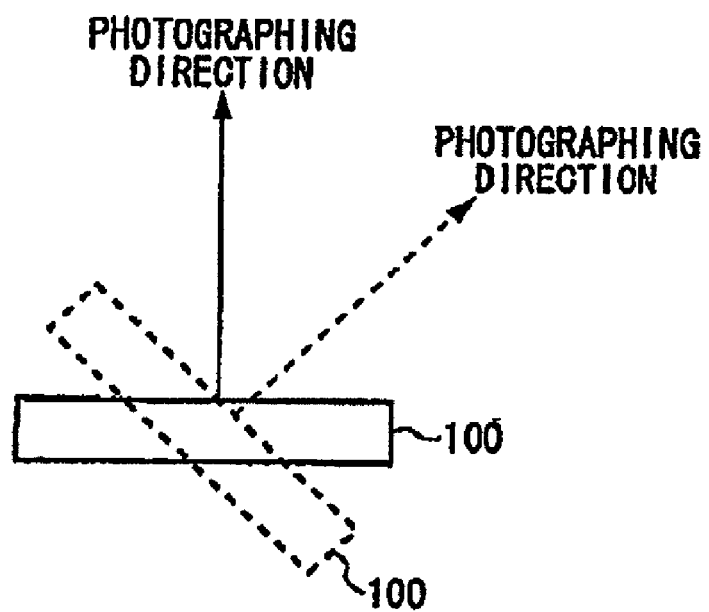
FIG. 17B is an explanatory drawing illustrating the portable telephone moving rotationally in which the photographing direction of the photographing unit does change.

FIG. 17 shows the mode of movement of the portable telephone 100. FIG. 17A shows the translational mode in which the photographing direction of the photographing unit 430 does not change, and the FIG. 17B shows the rotational mode in which the photographing direction of the photographing unit 430 does change.

As shown in FIG. 17A, when the portable telephone 100 moves translationally, the change of position in the photographed images of the subject 424, which is the farthest from the photographing unit 430, is very few as shown in FIGS. 16A and 16B. On the other hand, as shown in FIG. 17B, when the portable telephone 100 rotates, the change of position in the photographed images of the subject 424, which is the farthest from the photographing unit 430, is substantially large.

The display control unit 440 may control the position of the pointer 414 assuming that direction and distance of the translational movement of the portable telephone to be the travel distance, or assuming that direction and angle of the rotational movement of the portable telephone 100 to be the travel distance. In these cases, the travel distance computing unit 442 detects whether the portable telephone 100 moves translationally or rotationally, the travel distance of the portable telephone 100 in each detected mode is computed, and the display control unit 440 controls the position of the pointer 414 according to the computed travel distance.

For example, the travel distance computing unit 442 detects the mode of movement of the portable telephone 100 based on the ratio of the amount of change of the position of the subject 426, which is the closest subject from the photographing section 430, to those of the other subjects 418, 422, or 424, which are located farther than the subject 426. In the present embodiment, the travel distance computing unit 442 detects the mode of movement of the portable telephone 100 based on the ratio of the amount of change of the position of the subject 426, which is the nearest from the photographing unit 430, to that of the position of the subject 424, which is the farthest from the photographing unit 430. For example, the travel distance computing unit 442 includes the threshold table according to the difference between the distances from the photographing unit 430 to the subject 424 and the subject 426, and when the ratio of the amount of change of the subject 424 to the amount of change of the subject 426 is larger than the threshold according to the difference of the distance, the travel distance computing unit 442 decides that the portable telephone 100 is rotating.

Moreover, when the display control unit 440 controls the position of the pointer 414 according to the direction and distance of translational movement of the portable telephone 100 while the portable telephone 100 is moving both translationally and rotationally, the travel distance computing unit 442 may compute the travel distance of the portable telephone 100 by subtracting the amount of change of position caused by the rotation of the portable telephone 100 from the amount of change of position of each of the subjects 418, 422, 424 and 426 in the plurality of photographed images. For example, the travel distance computing unit 442 detects a subject, of which the distance from the photographing unit 430 is farther than a predetermined threshold, and computes the direction and angle of rotation of the portable telephone 100 based on the direction of change and the amount of change of the position of the subject, and also based on the distance from the photographing unit 430 to the subject. Then, the display control unit 440 corrects the amount of change of the subject, which is closest to the photographing unit 430, by adding or subtracting quantity corresponding to the distance to the subject from the photographing unit 430, and also corresponding to the direction and angle of rotation of the portable telephone 100. The display control unit 440 controls the position of the pointer 414 based on the corrected amount of change.

In this way, a slight rotational movement of the portable telephone 100 during the translational movement is tolerable, so that user can easily move the pointer 414 to a desired position.

Moreover, when the instruction input unit 420 receives the instruction to change the position of the pointer 414, it is preferable that the travel distance computing unit 442 performs image processing to increase the contrast of the photographed image, and detects the movement of the portable telephone 100 based on the photographed image of which the contrast is increased. For example, when the instruction input unit 420 receives the instruction to change the position of the pointer 414, the travel distance computing unit 442 performs a gamma correction differently from the normal condition to increase the contrast of the photographed image.

Figure 18:
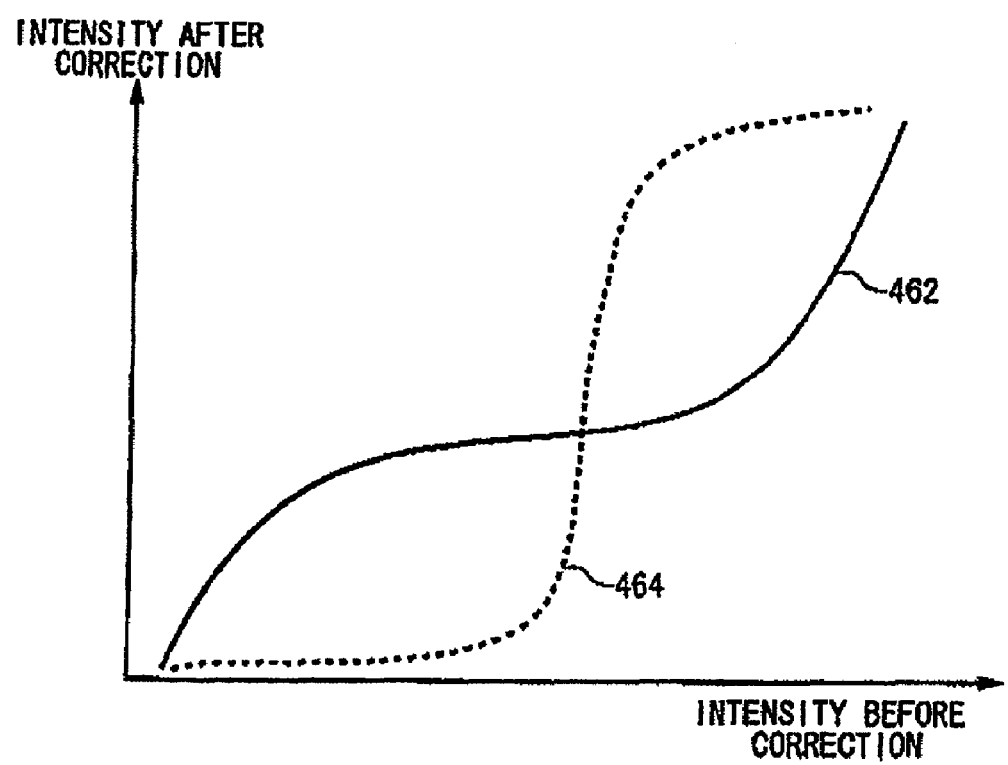
FIG. 18 is a chart exemplary showing gamma curves for gamma correction to the photographed image.

FIG. 18 is a chart exemplary showing gamma curves for gamma correction of the photographed image. The travel distance computing unit 442 performs a gamma correction to the photographed image using a gamma curve shown as a solid line 462 during normal operation. Then, when the instruction input unit 420 receives the instruction to change the position of the pointer 414, the travel distance computing unit 442 performs a gamma correction to the photographed image using a gamma curve shown as a dashed line 464 to increase the contrast of the photographed image. That is, when the instruction input unit 420 receives the instruction to change the position of the pointer 414, the travel distance computing unit 442 increases intensity of pixels, of which the intensity before the correction is less than or equal to a predetermined value, to about zero, and increases intensity of pixels, of which the intensity before the correction is more than the predetermined value, to values substantially larger than zero. In this way, the subject in the photographed image can be detected easily and accurately, and the position of the pointer 414 can be controlled more accurately.

Moreover, when the instruction input unit 420 receives the instruction to change the position of the pointer 414, it is preferable that the travel distance computing unit 442 detects movement of the portable telephone 100 based on the photographed image at a resolution lower than the that in the normal operation. For example, when the instruction input unit 420 receives the instruction to change the position of the pointer 414, the photographing unit 430 may generate the image based on pixel signals output from a part of the plurality of image sensors 434, and the signals from the other part of the plurality of image sensors 434 will be ignored. That is, a photographing unit 430 may thin out the signals from the plurality of image sensors 434 at a predetermined interval to output the pixel signals, and supply them to the travel distance computing unit 442. In this way, the change of position of the subject can be detected more efficiently.

Moreover, in the case that the travel distance computing unit 442 detects the movement of the portable telephone 100 based on the low resolution image, it is preferable that the photographing unit 430 bring the photographing unit 430 out of focus from the subject during photographing the image. For example, when the instruction input unit 420 receives the instruction to change the position of the pointer 414, the automatic focus unit 436 may control the optical lens 432 out of focus from the subject and then cause the photographing unit 430 to photograph the subject.

Moreover, the travel distance computing unit 442 may increase the frame rate of the photographing unit 430 photographing a dynamic image when the instruction input unit 420 receives the instruction to change the position of the pointer 414. In this way, the movement of the portable telephone 100 can be detected more accurately.

In addition, according to the embodiment illustrated in FIG. 15, the display control unit 440 displays an arrow, which is superimposed on the image, as a pointer pointing a part of the image. However, according to the present invention, the pointer is not limited in this respect. As another example of the pointer, instead of using a scroll bar, a jog dial or a jog stick, the display control unit 440 may scroll a display screen, may change the selected area on the display screen, and may change a plurality of running viewers corresponding to the travel distance of the portable telephone 100. For example, when a plurality of thumbnail images are displayed on the displaying unit 410 and some of them are selected, the display control unit 440 select thumbnail images once again, in which the difference of the position of a subject in the previously selected images and in the newly selected images corresponds to the travel distance of the portable telephone 100.

Figure 19:
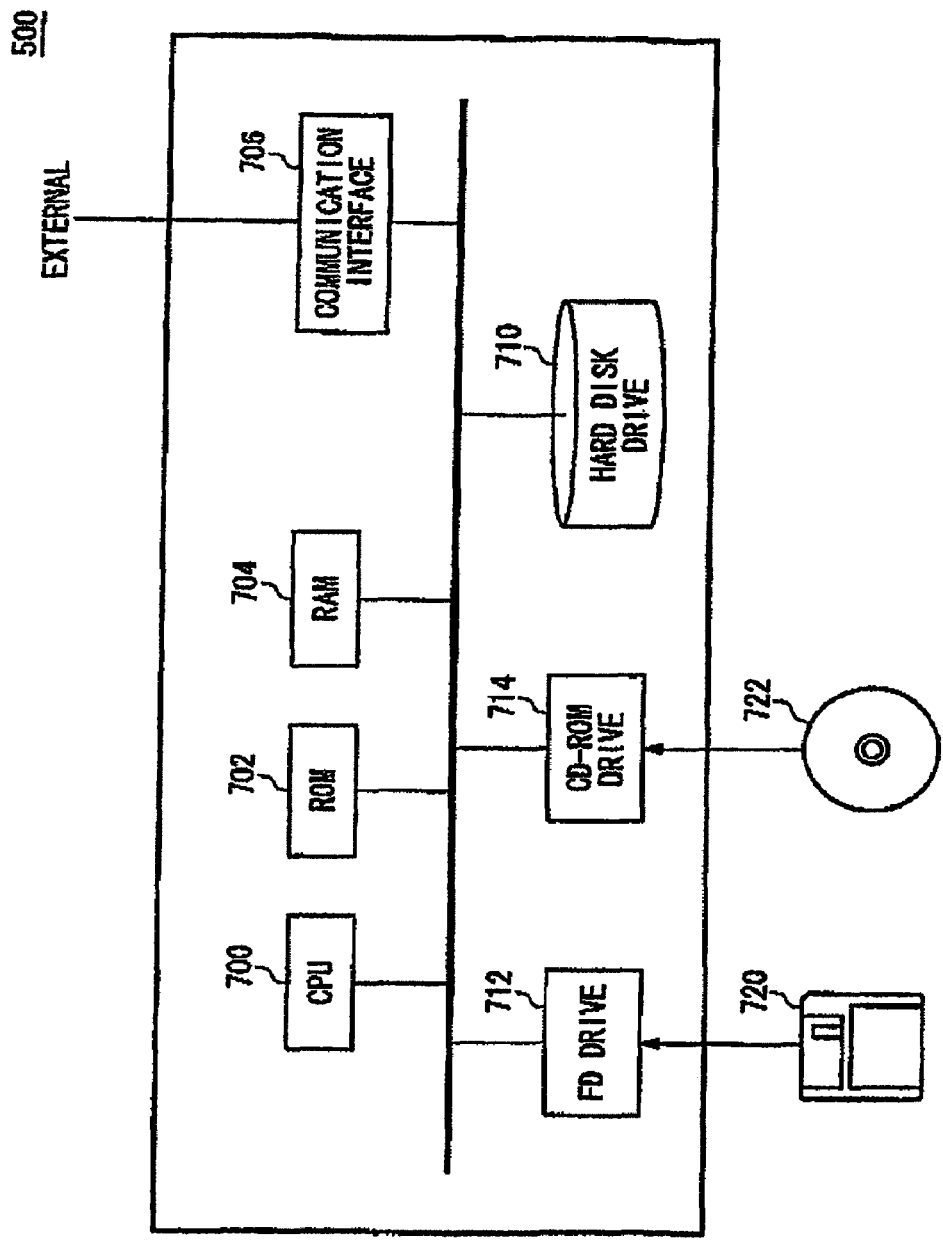
FIG. 19 is a block diagram exemplary showing a configuration of a computer which acts as a display control unit of the portable telephone.

FIG. 19 is a block diagram exemplary showing a configuration of a computer 500 which acts as the display control unit 440 and the travel distance computing unit 442 of the portable telephone 100. In the present embodiment, the computer 500 stores a machine readable medium storing thereon a plurality of machine executable instructions which causes the portable telephone 100 to act as the image photographing apparatus 100 which has been described with reference to FIGS. 1-18.

The computer 500 includes CPU 700, ROM 702, RAM 704, a communication interface 706, a hard disk drive 710, a flexible disk drive 712, and a CD-ROM drive 714. The CPU 700 operates based on the machine executable instructions stored on the ROM 702, the RAM 704, the hard disk drive 710, a flexible disk 720, and/or a CD-ROM 722.

For example, the machine executable instructions which operate the portable telephone 100 may cause the computer 500 to act as the display control unit 440 and the travel distance computing unit 442 which have been explained with reference to FIGS. 13-18, and may cause it to act as the displaying unit 410, the instruction input unit 420, the photographing unit 430, and the communication apparatus 450 which have been explained with reference to FIGS. 13-18.

For example the communication interface 706 communicates with the displaying unit 410, the instruction input unit 420, the photographing unit 430 and the communication apparatus 450, receives information such as status information of each component, and transmits control signals to control each component. The hard disk drive 710, the ROM 702 or the RAM 704 as an example of a storing device stores setting information, the machine executable instructions to operate the CPU 700 and the like. Alternatively, the machine executable instructions may be stored on a recording medium such as the flexible disk 720, the CD-ROM 722 or the like.

When the flexible disk 720 stores the machine executable instructions, the flexible disk drive 712 reads the machine executable instructions on the flexible disk 720 and provides the CPU 700 with them. When the CD-ROM 722 stores the machine executable instructions, the CD-ROM drive 714 reads the machine executable instructions on the CD-ROM 722 and provides the CPU 700 with them.

The machine executable instructions may be read from the recording medium by the RAM 704 directly and executed, or the machine executable instructions may be installed in the hard disk drive 710 once and then be read by the RAM 704 and executed. Furthermore, the machine executable instructions may be stored in a single recording medium or a plurality of record media. Moreover, the machine executable instructions stored on the recording medium may provide each function in cooperation with an operating system. For example, the machine executable instructions may request the operating system to do some or all functions, or the function may be provided based on the response from the operating system.

Instead of the flexible disk or the CD-ROM, it is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as the recording medium.

In all the embodiments described hereinbefore, although implementations of the portable telephone have been described to exemplify the image displaying apparatus according to the present invention, the image displaying apparatus according to the present invention is not limited in this respect. For example, the present invention may be implemented to a PDA (Personal Digital Assistant). Moreover, in any embodiment described hereinbefore, although the photographing unit is fixed to the displaying unit, the present invention is not limited in this respect. The image displaying apparatus according to the present invention can take any form as long as the displaying unit and the photographing unit can be carried all together. The term "all together" means the state where the photographing unit is fixed to the displaying unit, or the state where the photographing unit is operatively attached to the displaying unit, for example, the photographing unit is pivotally or slidably attached to the displaying unit with movement in at least one direction out of six degrees of freedom in the three dimensional space being restricted.

The image displaying apparatus, of which the photographing unit is movable with respect to the displaying unit, may further include a relative movement detection unit to detect whether the photographing unit is moved with respect to the displaying unit. When the relative movement detection unit detects the relative movement, the display screen of the displaying unit may be changed like when the displaying unit moves, although it is not necessary to change the image because the displaying unit does not move.

Moreover, according to all the embodiments described hereinbefore, the travel distance computing units 120 and 442 compute the moving distance or the rotation angle of the displaying units 130 and 410 as the travel distance. However, the travel distance is not limited in this respect. According to another embodiment, the travel distance computing units 120 and 442 may compute at least one of moving velocity and acceleration of the displaying units 130 and 410 as the travel distance. In this case, the display control units 170, 220, and 440 change the images on the displaying units 130 and 410 so that the moving distance in the images is proportional to the computed travel distance (velocity or acceleration). For example, in the portable telephone 100 shown in FIG. 14, when the moving velocity is faster, the arrow of the pointer displayed on the displaying unit 410 moves wider, or a thumbnail images to be selected among a plurality of thumbnail images are changed with skipping some thumbnail images rather than selecting the adjacent images, regardless of the moving distance of the portable telephone 100. Thereby, the moving distance in the images displayed on the displaying unit 410 can be changed as desired by controlling the moving velocity of the portable telephone 100 rather than controlling the moving distance of the portable telephone 100, so that the images can be changed even in a small space.

Moreover, according to all the embodiments described hereinbefore, the image storing unit 210 stores image data as images. However, the images stored on the image storing unit 210 are not limited in this respect. According to another embodiment, the image storing unit 210 may store character data, such as text data. In this case, the image storing unit 210 stores the relation between the number of characters displayable on the displaying units 130 and 410 and the travel distance of the displaying units 130 and 410 as scrolling information. Based on the scrolling information, the display control units 170, 220, and 440 scroll the image displayed on the displaying units 130 and 410 according to the travel distance of the displaying units 130 and 410, and change a part of the document data being displayed on the displaying units 130 and 410.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image displaying system for displaying image, comprising:
    an image storing unit storing thereon the image;
    a displaying unit operable to display the image, said displaying unit being carried by a user;
    a photographing unit operable to photograph exterior as a plurality of photographed images, said photographing unit being carried with said displaying unit all together;
    a travel distance computing unit operable to compute a travel distance of said displaying unit by analyzing the plurality of photographed images which are photographed by said photographing unit at different times; and
    a display control unit operable to change the image, which is different from photographed images, based on the travel distance computed by said travel distance computing unit and to causes said displaying unit to display the image, wherein
    said image storing unit associates change information for changing the image with the travel distance of said displaying unit;
    said display control unit causes said displaying unit to display the changed image based on the change information on the image associated with the travel distance computed by said distance computing unit referring to said image storing unit
    said image storing unit stores an original image, of which the area is larger than that of each of the images photographable by the photographing unit, and further stores a position in the original image as the change information, and
    said display control unit identifies the position in the original image based on change of direction of said displaying unit by referring to said image storing unit, trims the image from the original image so that the trimmed image is displayed on said displaying unit, and causes said displaying unit to display the image;
    wherein said travel distance computing unit detects a mode of movement of said displaying unit, the mode including a translational mode and a rotational mode, and said travel distance computing unit computes a travel distance corresponding to the detected mode of movement,
    wherein said travel distance computing unit detects distance to each of a plurality of subjects included in the photographed images, and detects the mode of movement of said displaying unit using the detected distance and the travel distance.

2. The image displaying system as claimed in claim 1, wherein
    said image storing unit associates a relative direction of each of a plurality of images with respect to a direction of one of the images with each of the plurality of images, and stores them, and
    said display control unit selects the image to be displayed on said displaying unit according to the relative direction.

3. The image displaying system as claimed in claim 1, wherein
    said photographing unit is fixed to a rear surface of said displaying unit,
    said travel distance computing unit computes a direction change of said displaying unit,
    said display control unit selects an image stored on said image storing unit so that difference between direction of the image being displaying and direction of the selected image corresponds to the direction change of said displaying unit, and updates the image being displayed on said displaying unit to the selected image.

4. The image displaying system as claimed in claim 1, further comprising an original image generation unit operable to generate the original image by composing the plurality of photographed images photographed by said photographing unit, and to cause said image storing unit to store the generated original image.

5. The image displaying system as claimed in claim 4, wherein said original image generation unit computes a travel distance of said photographing unit during photographing the plurality of photographed images, and associates the computed travel distance with the position in the image.

6. The image displaying system as claimed in claim 5, wherein said original image generation unit associates the associated travel distance and the position in the image with the original image, and stores them on said image storing unit.

7. The image displaying system as claimed in claim 5, wherein said original image generation unit sets one of the plurality of photographed images as a reference position image, and computes a travel distance of said photographing unit based on the other photographed images with respect to the reference position image.

8. The image displaying system as claimed in claim 4, wherein said original image generation unit computes a travel distance of said displaying unit during photographing the plurality of photographed images, associates the computed travel distance with the position in the original image, and causes said image storing unit to store them.

9. The image displaying system as claimed in claim 8, further comprising a user photographing unit operable to photograph the user, said photographing unit being located on a side of said displaying unit, wherein
    said original image generation unit computes the travel distance of said displaying unit during photographing the plurality of photographed images based on a user image photographed by said user photographing unit.

10. The image displaying system as claimed in claim 1, wherein
    said photographing unit comprises a fish-eye lens, and
    the image displaying system further comprises an original image generation unit operable to generate the original image by correcting distortion of the photographed images photographed by said fish-eye lens and to cause said image storing unit to store the original image.

11. The image displaying system according to claim 1, further comprising a focusing unit which measures the distance to each of the subjects.

12. An image displaying apparatus operable to display an image, the image displaying apparatus being carried by a user, comprising:
a displaying unit operable to display the image;
a photographing unit operable to photograph exterior as a plurality of photographed images, said photographing unit being carried with said displaying unit all together;
a travel distance computing unit operable to compute a travel distance of said displaying unit by analyzing the plurality of photographed images which are photographed by said photographing unit at different times;
an original image generation unit operable to generate an original image, of which the area is larger than that of each of the images photographable by the photographing unit; and
a display control unit operable to change the image, which is different from the photographed images, based on the travel distance computed by said travel distance computing unit and to cause said displaying unit to display the image, said display control unit identifying the position in the original image based on change of direction of said displaying unit by referring to said original image generating unit, trims the image from the original image so that the trimmed image is displayed on said displaying unit, and causes said displaying unit to display the image,
wherein said travel distance computing unit detects a mode of movement of said displaying unit, the mode including a translational mode and a rotational mode, and said travel distance computing unit computes a travel distance corresponding to the detected mode of movement,
wherein said travel distance computing unit detects distance to each of a plurality of subjects included in the photographed images, and detects the mode of movement of said displaying unit using the detected distance and the travel distance.

13. The image displaying apparatus as claimed in claim 12, wherein
a relative direction of each of a plurality of images with respect to a direction of one of the images is associated with each of the plurality of images, and
said display control unit selects the image to be displayed on said displaying unit according to the relative direction.

14. The image displaying apparatus as claimed in claim 12, wherein
said photographing unit is fixed to a rear surface of said displaying unit,
said travel distance computing unit computes a direction change of said displaying unit,
said display control unit selects an image so that difference between direction of the image being displayed and direction of the selected image corresponds to the direction change of said displaying unit, and updates the image being displayed on said displaying unit to the selected image.

15. The image displaying apparatus as claimed in claim 12, wherein the original image generation unit is operable to generate the original image by composing the plurality of photographed images photographed by said photographing unit.

16. The image displaying apparatus as claimed in claim 15, wherein said original image generation unit computes a travel distance of said photographing unit during photographing the plurality of photographed images, and associates the computed travel distance with the position in the image.

17. The image displaying apparatus as claimed in claim 16, wherein said original image generation unit associates the associated travel distance and the position in the image with the original image.

18. The image displaying apparatus as claimed in claim 16, wherein said original image generation unit sets one of the plurality of photographed images as a reference position image, and computes a travel distance of said photographing unit based on the other photographed images with respect to the reference position image.

19. The image displaying apparatus as claimed in claim 15, wherein said original image generation unit computes a travel distance of said displaying unit during photographing the plurality of photographed images, associates the computed travel distance with the position in the original image.

20. The image displaying apparatus as claimed in claim 19, further comprising a user photographing unit operable to photograph the user, said photographing unit being located on a side of said displaying unit, wherein
said original image generation unit computes the travel distance of said displaying unit during photographing the plurality of photographed images based on a user image photographed by said user photographing unit.

21. The image displaying apparatus as claimed in claim 12, wherein
said photographing unit comprises a fish-eye lens, and
the image displaying system further comprises an original image generation unit operable to generate the original image by correcting distortion of the photographed images photographed by said fish-eye lens.

22. A non-transitory computer-readable medium having embodied thereon a plurality of machine executable instructions for controlling an image displaying apparatus operable to display an image, the image displaying apparatus being carried by a user, when executed by a machine, the machine executable instructions causing the image displaying apparatus to:
display the image on a displaying unit;
photograph a plurality of images of exterior using a photographing unit, said photographing unit being carried with said displaying unit all together;
compute a travel distance of said displaying unit using a travel distance computing unit by analyzing the plurality of photographed images which are photographed by said photographing unit at different times;
generate an original image, of which the area is larger than that of each of the images photographable by the photographing unit;
change the image, which is different from the photographed images, based on the travel distance computed by said travel distance computing unit, and cause said displaying unit to displaying the image;
identify the position in the original image based on change of direction of said displaying unit by referring to said original image generating unit;
trim the image from the original image so that the trimmed image is displayed on said displaying unit; and
cause said displaying unit to display the image,
wherein computing the travel distance comprises detecting a mode of movement of said displaying unit, the mode including a translational mode and a rotational mode, and said travel distance computing step comprises computing a travel distance corresponding to the detected mode of movement,
wherein said travel distance computing unit detects distance to each of a plurality of subjects included in the photographed images, and detects the mode of movement of said displaying unit using the detected distance and the travel distance.

23. An image displaying system for displaying image, comprising:
an image storing unit storing thereon the image;
a displaying unit operable to display the image, said displaying unit being carried by a user;
a photographing unit operable to photograph exterior as a plurality of photographed images, said photographing unit being carried with said displaying unit all together;
a travel distance computing unit operable to compute a travel distance of said displaying unit by analyzing the plurality of photographed images which are photographed by said photographing unit at different times; and
a display control unit operable to change the image, which is different from photographed images, based on the travel distance computed by said travel distance computing unit and to causes said displaying unit to display the image, wherein
said image storing unit associates change information for changing the image with the travel distance of said displaying unit;
said display control unit causes said displaying unit to display the changed image based on the change information on the image associated with the travel distance computed by said distance computing unit referring to said image storing unit
said image storing unit stores an original image, of which the area is larger than that of each of the images photographable by the photographing unit, and further stores a position in the original image as the change information, and
said display control unit identifies the position in the original image based on change of direction of said displaying unit by referring to said image storing unit, trims the image from the original image so that the trimmed image is displayed on said displaying unit, and causes said displaying unit to display the image;
wherein said travel distance computing unit detects a mode of movement of said displaying unit, the mode including a translational mode and a rotational mode, and said travel distance computing unit computes a travel distance corresponding to the detected mode of movement,
wherein said travel distance computing unit computes, as the travel distance, a movement of one or more subjects, of which a detected distance from the photographing unit to the one or more subjects is smaller than a predetermined threshold.

24. The image displaying system as claimed in claim 23, wherein
said image storing unit associates a relative direction of each of a plurality of images with respect to a direction of one of the images with each of the plurality of images, and stores them, and
said display control unit selects the image to be displayed on said displaying unit according to the relative direction.

25. The image displaying system as claimed in claim 23, wherein
said photographing unit is fixed to a rear surface of said displaying unit,
said travel distance computing unit computes a direction change of said displaying unit,
said display control unit selects an image stored on said image storing unit so that difference between direction of the image being displaying and direction of the selected image corresponds to the direction change of said displaying unit, and updates the image being displayed on said displaying unit to the selected image.

26. The image displaying system as claimed in claim 23, further comprising an original image generation unit operable to generate the original image by composing the plurality of photographed images photographed by said photographing unit, and to cause said image storing unit to store the generated original image.

27. The image displaying system as claimed in claim 26, wherein said original image generation unit computes a travel distance of said photographing unit during photographing the plurality of photographed images, and associates the computed travel distance with the position in the image.

28. The image displaying system as claimed in claim 27, wherein said original image generation unit associates the associated travel distance and the position in the image with the original image, and stores them on said image storing unit.

29. The image displaying system as claimed in claim 27, wherein said original image generation unit sets one of the plurality of photographed images as a reference position image, and computes a travel distance of said photographing unit based on the other photographed images with respect to the reference position image.

30. The image displaying system as claimed in claim 26, wherein said original image generation unit computes a travel distance of said displaying unit during photographing the plurality of photographed images, associates the computed travel distance with the position in the original image, and causes said image storing unit to store them.

31. The image displaying system as claimed in claim 30, further comprising a user photographing unit operable to photograph the user, said photographing unit being located on a side of said displaying unit, wherein
said original image generation unit computes the travel distance of said displaying unit during photographing the plurality of photographed images based on a user image photographed by said user photographing unit.

32. The image displaying system as claimed in claim 23, wherein
said photographing unit comprises a fish-eye lens, and
the image displaying system further comprises an original image generation unit operable to generate the original image by correcting distortion of the photographed images photographed by said fish-eye lens and to cause said image storing unit to store the original image.

33. The image displaying system according to claim 23, further comprising a focusing unit which measures the distance to each of the subjects.

34. An image displaying apparatus operable to display an image, the image displaying apparatus being carried by a user, comprising:
a displaying unit operable to display the image;
a photographing unit operable to photograph exterior as a plurality of photographed images, said photographing unit being carried with said displaying unit all together;
a travel distance computing unit operable to compute a travel distance of said displaying unit by analyzing the plurality of photographed images which are photographed by said photographing unit at different times;
an original image generation unit operable to generate an original image, of which the area is larger than that of each of the images photographable by the photographing unit; and
a display control unit operable to change the image, which is different from the photographed images, based on the travel distance computed by said travel distance computing unit and to cause said displaying unit to display the image, said display control unit identifying the position in the original image based on change of direction of said displaying unit by referring to said original image generating unit, trims the image from the original image so that the trimmed image is displayed on said displaying unit, and causes said displaying unit to display the image, wherein said travel distance computing unit detects a mode of movement of said displaying unit, the mode including a translational mode and a rotational mode, and said travel distance computing unit computes a travel distance corresponding to the detected mode of movement, wherein said travel distance computing unit computes, as the travel distance, a movement of one or more subjects, of which a detected distance from the photographing unit to the one or more subjects is smaller than a predetermined threshold.

35. The image displaying apparatus as claimed in claim 34, wherein a relative direction of each of a plurality of images with respect to a direction of one of the images is associated with each of the plurality of images, and said display control unit selects the image to be displayed on said displaying unit according to the relative direction.

36. The image displaying apparatus as claimed in claim 34, wherein said photographing unit is fixed to a rear surface of said displaying unit, said travel distance computing unit computes a direction change of said displaying unit, said display control unit selects an image so that difference between direction of the image being displayed and direction of the selected image corresponds to the direction change of said displaying unit, and updates the image being displayed on said displaying unit to the selected image.

37. The image displaying apparatus as claimed in claim 34, wherein the original image generation unit is operable to generate the original image by composing the plurality of photographed images photographed by said photographing unit.

38. The image displaying apparatus as claimed in claim 37, wherein said original image generation unit computes a travel distance of said photographing unit during photographing the plurality of photographed images, and associates the computed travel distance with the position in the image.

39. The image displaying apparatus as claimed in claim 38, wherein said original image generation unit associates the associated travel distance and the position in the image with the original image.

40. The image displaying apparatus as claimed in claim 38, wherein said original image generation unit sets one of the plurality of photographed images as a reference position image, and computes a travel distance of said photographing unit based on the other photographed images with respect to the reference position image.

41. The image displaying apparatus as claimed in claim 37, wherein said original image generation unit computes a travel distance of said displaying unit during photographing the plurality of photographed images, associates the computed travel distance with the position in the original image.

42. The image displaying apparatus as claimed in claim 41, further comprising a user photographing unit operable to photograph the user, said photographing unit being located on a side of said displaying unit, wherein said original image generation unit computes the travel distance of said displaying unit during photographing the plurality of photographed images based on a user image photographed by said user photographing unit.

43. The image displaying apparatus as claimed in claim 34, wherein said photographing unit comprises a fish-eye lens, and the image displaying system further comprises an original image generation unit operable to generate the original image by correcting distortion of the photographed images photographed by said fish-eye lens.

44. A non-transitory computer-readable medium having embodied thereon a plurality of machine executable instructions for controlling an image displaying apparatus operable to display an image, the image displaying apparatus being carried by a user, when executed by a machine, the machine executable instructions causing the image displaying apparatus to:

display the image on a displaying unit;

photograph a plurality of images of exterior using a photographing unit, said photographing unit being carried with said displaying unit all together;

compute a travel distance of said displaying unit using a travel distance computing unit by analyzing the plurality of photographed images which are photographed by said photographing unit at different times;

generate an original image, of which the area is larger than that of each of the images photographable by the photographing unit;

change the image, which is different from the photographed images, based on the travel distance computed by said travel distance computing unit, and cause said displaying unit to displaying the image;

identify the position in the original image based on change of direction of said displaying unit by referring to said original image generating unit;

trim the image from the original image so that the trimmed image is displayed on said displaying unit; and cause said displaying unit to display the image, wherein computing the travel distance comprises detecting a mode of movement of said displaying unit, the mode including a translational mode and a rotational mode, and said travel distance computing step comprises computing a travel distance corresponding to the detected mode of movement, wherein said travel distance computing unit computes, as the travel distance, a movement of one or more subjects, of which a detected distance from the photographing unit to the one or more subjects distance is smaller than a predetermined threshold.

45. The image displaying system according to claim 44, further comprising a focusing unit which measures the distance to each of the subjects.

* * * * *